INVENTORS G. P. DARWIN
W. A. MALTHANER
J. E. SCHWENKER
BY [signature]
ATTORNEY

INVENTORS G. P. DARWIN
W. A. MALTHANER
J. E. SCHWENKER

BY

ATTORNEY

DIGIT DATA TRANSMISSION SYSTEM

Filed Jan. 24, 1956 9 Sheets-Sheet 3

INVENTORS G. P. DARWIN
W. A. MALTHANER
J. E. SCHWENKER
BY [signature]
ATTORNEY

| | CODES | | |
|---|---|---|---|
| START | 1111111 | 1111001 | |
| STOP | | 1001111 | 1111111 |
| TAPE ERROR | | 1100111 | |
| ERROR | | 1010111 | |
| CORRECT | | 0011111 | |
| TYPING ERROR | | 0101111 | |
| DIGIT | | 1234567 | |

PRECEDED BY START (TAPE ERROR, ERROR, CORRECT, TYPING ERROR)

INVENTORS G. P. DARWIN
W. A. MALTHANER
J. E. SCHWENKER
BY [signature]
ATTORNEY

DIGIT DATA TRANSMISSION SYSTEM

Filed Jan. 24, 1956 9 Sheets-Sheet 5

TAPE CHARACTERISTICS

INVENTORS G. P. DARWIN
W. A. MALTHANER
J. E. SCHWENKER
BY James S. Falk
ATTORNEY March 25, 1958 G. P. DARWIN ET AL 2,828,362

DIGIT DATA TRANSMISSION SYSTEM

Filed Jan. 24, 1956 9 Sheets-Sheet 6

INVENTORS G. P. DARWIN
W. A. MALTHANER
J. E. SCHWENKER
BY [signature]
ATTORNEY

INVENTORS G. P. DARWIN
W. A. MALTHANER
J. E. SCHWENKER
BY [signature]
ATTORNEY

March 25, 1958 G. P. DARWIN ET AL 2,828,362

DIGIT DATA TRANSMISSION SYSTEM

Filed Jan. 24, 1956 9 Sheets-Sheet 8

INVENTORS G. P. DARWIN
W. A. MALTHANER
J. E. SCHWENKER
BY [signature]
ATTORNEY

DIGIT DATA TRANSMISSION SYSTEM

Filed Jan. 24, 1956 9 Sheets-Sheet 9

INVENTORS G. P. DARWIN
W. A. MALTHANER
J. E. SCHWENKER
BY [signature]
ATTORNEY 2,828,362
Patented Mar. 25, 1958

2,828,362

DIGIT DATA TRANSMISSION SYSTEM

George P. Darwin, Summit, William A. Malthaner, New Providence, and John E. Schwenker, Gillette, N. J., assignors to Bell Telephone Laboratories, Incorporated, New York, N. Y., a corporation of New York Application January 24, 1956, Serial No. 560,966

38 Claims. (Cl. 179—2)

This invention relates to transmission of data and particularly to high speed coded digital data transmission adapted for use between subscriber stations in a telephone system.

Progress in the computer and related fields has developed to such an extent that knowledge may now be converted to digital form and concentrated in a storage unit to be read therefrom at will, rapidly and with a high degree of accuracy. With the growth of this art and the ever increasing use of its products, there is a recognition of the need for rapid interchange of such stored knowledge between units in various locations, in order, for example, to keep all phases of a company's functions coordinated.

It is a general object of this invention to enable rapid and accurate transfer of stored data from one location to another by employment of telephone transmission facilities.

Data transmission systems are well known in the telegraphic and related arts. Such systems in present use, however, do not achieve the high speed of operation required for economical transfer over long distances utilizing transmission systems such as telephone toll lines. Likewise means are not available in present systems for providing a complete check on the accuracy of transmitted data to assure that it is correct and, if not, to correct it automatically and thereafter to transcribe it at the receiving end in a form of memory storage compatible with associated equipment, such as a computer, which will utilize the data.

One preferred embodiment of this invention, described hereinafter, employs a signaling arrangement in which code and information signals in the form of binary digits are transmitted by means of double sideband, carrier current signals produced by pulse code, amplitude modulation without synchronization of the carrier current sources. The band is chosen such that low frequency phase distortion is minimized and excessive frequency shift is controlled by proper maintenance of the carrier terminals in the telephone transmission medium.

In accordance with one aspect of this invention, data to be transferred rapidly over a long distance is recorded on magnetic tape or other suitable medium. Combination transmitter-receiver units, referred to hereinafter as "data subsets," are associated with subscriber telephone substations at calling and called locations so that the party desiring to transmit data may advise the called party by placing a usual call over the telephone line. The transmitting party places the medium holding the recorded intelligence in the data subset associated with his telephone subset, and upon establishing a connection with the called party, he switches his data subset into the telephone line path in a transmitting condition. The data subset at the receiving end is switched into the line by the called party and set to receive the data transmitted over the line. Transmission begins immediately, and both data subsets monitor the data as it is transmitted and received respectively. The message data is interspersed with code signals directing internal operation of the data subsets to synchronize, stop and restart them and to cause them to formulate additional directive signals.

The entire message is transmitted in blocks of intelligence characters of any designated length, such as a typewriter line of type, after each of which a code signal stops the transmitter. If the block was received correctly, the receiving unit returns an acknowledgment so indicating. The acknowledgment activates the transmitter to transmit the next block of data. If the receiving unit finds an error among the transmitted intelligence characters of a block of data, it will return to the transmitting unit at the end of the block, an acknowledgment evidencing the presence of an error. The transmitting unit, upon receipt of this signal, will retransmit the same block. Thus, errors due to circuit noise are eliminated. If an error appears during a second transmission of a particular block, both data subsets are automatically shut off and an alarm sounded. Errors on the storage medium in the transmitting unit will be recognized by the transmitting unit which, in turn, will advise the receiving unit merely to note the error on the output medium. Transfer of an erroneous character to the storage medium to be placed in the transmitting unit may be noted by the printing of a special code signal at the end of the information block containing the error, after which the correct block of information is transferred to the storage medium. The special code signal is recognized by the transmitting unit which responds thereto by stopping transmission until the block in error has been passed through the unit.

In this fashion a complete, accurate transfer of digital information is accomplished with a minimum of actual operating time in which the telephone line is occupied.

A feature of this invention is a signal transmitting device arranged to initiate the transmission of signals over a telephone line upon actuation of the device, to stop the transmission internally in response to a particular code signal, and to restart transmission upon receipt over the transmission path of a particular code signal.

Another feature of the invention is the provision of signal responsive means associated with a transmitter for stopping the transmission of carrier current signals after each block of transmitted data and for restarting transmission upon receipt of an acknowledgment signal from the receiving end of the transmission line.

Another feature of the invention is a signal receiver responsive to pulse code, amplitude modulated, double sideband, carrier current signals including stop, start, recording error, transmission error and information digits. According to this feature the signal receiver includes a detector responsive to pulse code, amplitude modulated, double sideband, carrier current signals, a synchronizing and checking circuit, a control circuit and a special code generator.

A further feature of this invention is the provision of carrier current signal transmitting means associated with a signal receiver according to the preceding paragraph for transmitting an acknowledgment code signal to the originating transmitter to permit transmission of carrier current signals from the originating end of the line over which signals are being received and transmitted to continue or to cause the originating transmitter to retransmit certain data.

A still further feature of this invention is the provision of signal responsive means associated with a receiver for delineating information signals transmitted thereto over a telephone line and to record such delineations on the output medium along with the information signals.

These and other features of the invention are embodied in the system shown schematically in the accompanying drawing. This invention is not limited in application, however, to the system shown but is generally applicable to signaling systems requiring the rapid transmission of intelligence in coded digital form.

Referring now to the drawing.

Figures 1, 2, 9:
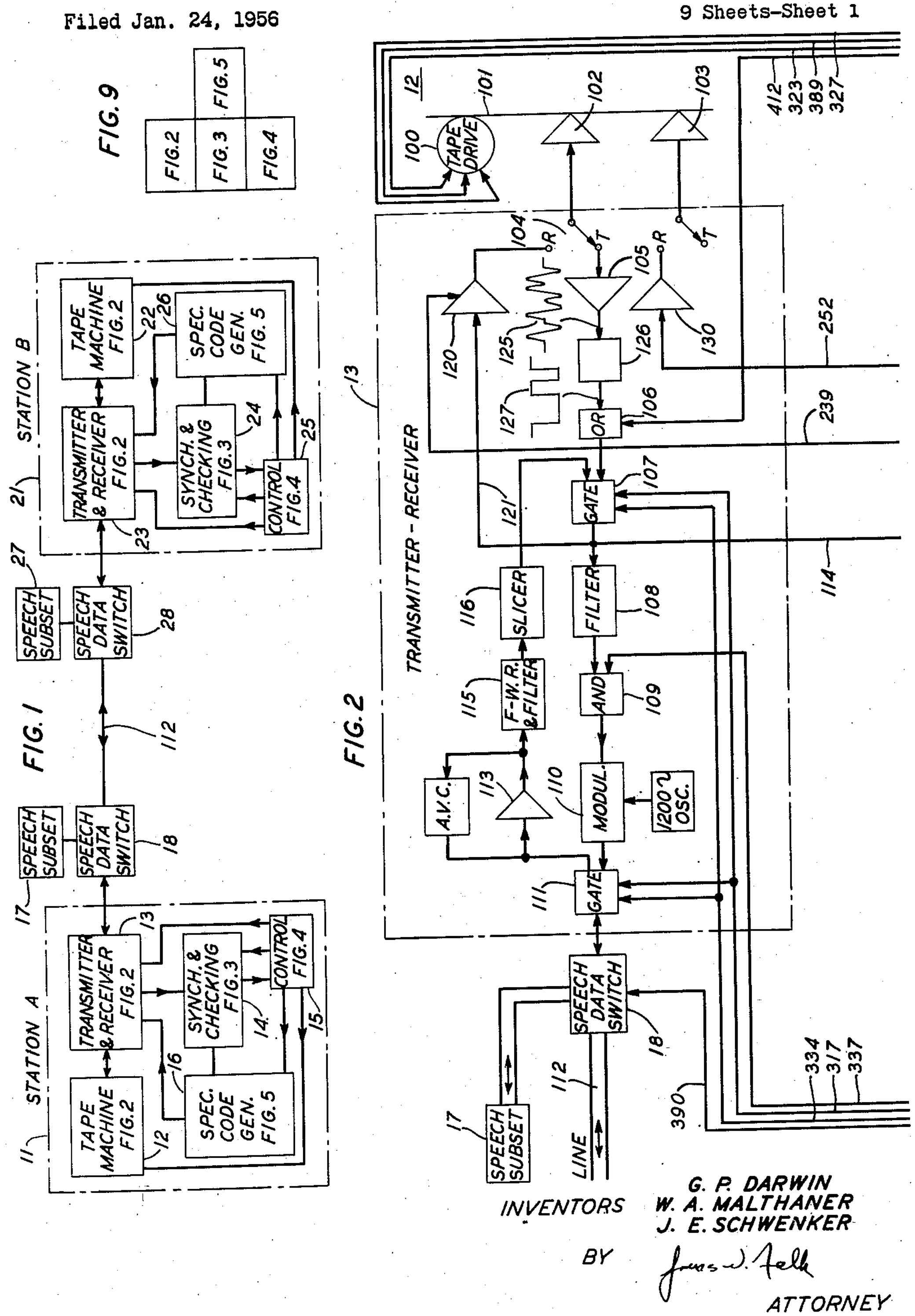
Fig. 1 is a schematic block diagram representing a connection between two subscriber stations in a telephone system, each station having associated therewith a data subset in accordance with one specific illustrative embodiment of this invention.
Fig. 2 is a schematic block diagram of one specific transmitter-receiver portion of the data subsets shown in Fig. 1.
Fig. 9 is a key pattern for Figs. 2–5.

Fig. 1 is a block schematic representation of one specific illustrative embodiment of this invention showing a connection between a subscriber station A and a subscriber station B, which stations may be in the same telephone exchange or in exchanges remote from one another. Associated with each of the subscriber stations A and B are data subsets 11 and 21, respectively, which may be switched onto the line 112 in place of the speech subsets 17 and 27 when the circuit has been established between the two stations. The party at station A, for example, may orally advise the party at B that he desires to transmit data. Both parties then switch their respective data subsets onto the line, data subset 11 being in a transmitting condition and data subset 21 in a receiving condition.

The memory storage device in the data subset may be any one of the many familiar storage means in use today such as punched cards, magnetic drum, magnetic tape, etc. In the specific illustrative embodiment described hereinafter, a magnetic tape is utilized both at the transmitting end and receiving end. Intelligence to be transmitted is transcribed on the tape in a seven element per character binary code. The tape is prepared so as to present the intelligence information in blocks of characters of any designated length. A block size comparable to a standard line of type is convenient for conversion to a typed message at the receiving end and also permits rapid internal correction of errors. Such a block size is thus utilized in this specific illustrative embodiment of this invention.

Figure 7:
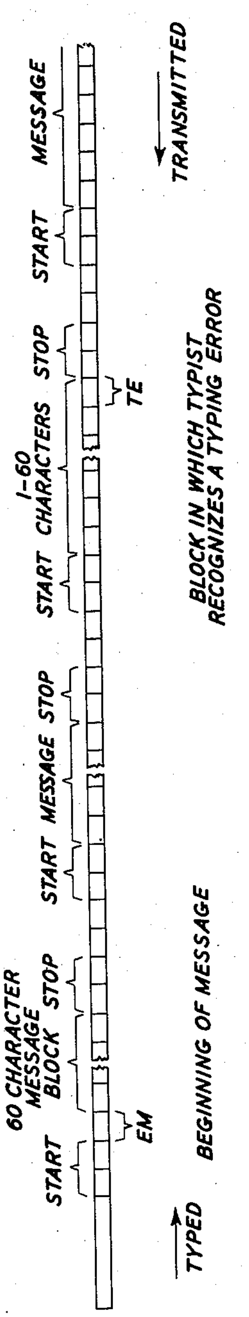
Fig. 7 illustrates the sequence of directive and intelligence characters appearing on the transmitting magnetic tape utilized in the specific illustrative embodiment of this invention.

A sample section of the magnetic tape utilized in this specific embodiment of this invention is shown in Fig. 7. The characters registered on the tape are shown in a typical arrangement including all of the character types which may be printed on the tape prior to insertion in the tape machine of the transmitting unit. Characters are printed from left to right on the tape, as shown in Fig. 7, including the Start character, and End of Signaling character EM, the characters comprising a block of intelligence and a Stop character. Succeeding blocks of intelligence characters are preceded and succeeded by Start and Stop characters respectively. Each character is designated by a single space on the tape in Fig. 7 although it will be appreciated that each character contains a plurality of elements each having one of two states referred to herein as "one" and "zero." A Typing Error character TE is shown inserted at the end of a block of intelligence characters but preceding the Stop character for that block. With the tape wound in reverse in the tape machine of the transmitting unit it can be seen that the Typing Error will be transmitted prior to the block of intelligence containing the error and also that the End of Signaling character EM will succeed the last block of intelligence characters to be transmitted. As the Start and Stop characters are merely the reverse of one another, they will appear in proper order during reverse transmission. The receiving unit 21 also winds the tape in reverse, so that upon readout from the receiving unit, the characters will appear in the order shown in Fig. 7.

The data subset 11, shown schematically at station A in Fig. 1, consists of storage and conversion circuits 12, which in this embodiment includes a magnetic tape machine, transmitter-receiver circuits 13, synchronizing and checking circuits 14, control circuits 15 and special code generator circuit 16. Data subset 21 at station B comprises circuits 22–26 which correspond to circuits 12–16, respectively, of data subset 11. These circuits are shown in detail in Figs. 2 through 5. The speech-data switches 18 and 28 provide for switching between telephone subset and data subset, automatically switching from the latter to the former subset upon completion of data transmission, as described further below. The switches 18 and 28 may advantageously comprise a relay having contacts normally connecting the telephone subset to the line 112. Upon energization of the relay, as by manually closing a switch to apply current to the relay coil, there occurs a contact transferral connecting the data subset to the line. Removal of this holding current, in a manner known in the art, will automatically transfer the line back to the telephone subset.

The invention will now be briefly described with reference to the block schematic of Fig. 1. The tape box holding the magnetic tape on which intelligence to be transmitted has been recorded in a suitable code is fitted to the tape machine 12 of station A. A blank type is placed in the tape machine 22 of remote station B. It is assumed that a telephone connection has been completed between subscriber stations A and B and that the party at subset 17, station A, has advised the party at subset 27, station B, that he desires to transmit data over the line to station B. Both parties throw the respective speech data switches 18 and 28 removing the subsets from the line and connecting data subsets 11 and 21 to the line. Switches designated T and R in Figs. 2–5 are actuated by a single control at each data subset to place data subset 11 in a transmitting condition and data subset 21 in a receiving condition respectively.

The tape machine storage unit 12 begins playing out tape from which magnetic flux signals are changed to electrical impulses and transferred to the transmitter-receiver circuit 13 and through this circuit to a synchonizing and checking circuit 14 as well as out over the line. These electrical impulses are advantageously of two types or states representing binary elements and are described hereinafter as "one" or "zero." A Start character, the first group of binary digits defining a character to be read from the magnetic tape, is effective to synchronize the operation of data subsets 11 and 21. Each subsequent character will be detected, checked and controlled in synchronism in the respective data subsets, as described hereinafter.

*Normal operation*

The Start character is followed by a plurality of intelligence characters each arranged in a code form to permit parity checking of the transmitted signals. Parity checking, as used herein, is a means for recognizing correct or erroneous characters by the ratio of one type of element to a second type of element present in each character, or merely the presence of an odd or even number of one element type per character. The code form used in the preferred embodiment is a seven element character containing an odd number of "one" elements. Should the parity checking circuits detect the presence of an even number of "ones" in a character, they will react to indicate an error. The parity checking circuits are contained in synchronizing and checking circuits 14 and 24, and serve to count the "one" elements of each intelligence character signal transmitted between stations A and B.

In normal operation it is assumed that no errors are present in the intelligence characters transferred from tape machine 12 and that no errors occur during transmission. In this event, a pluality or block of intelligence signals are transmitted after which a Stop character appears on the transmitting tape and is transmitted. The message block in the preferred embodiment may contain any desired number of characters according to the peculiar requirements of a particular application. The elements of the Stop character are passed to the synchronizing and checking circuit 14 which, in turn, will pass a stop signal to the control circuit 15. The control circuit 15 responds thereto by stopping the motion of the transmitting tape, blocking the transmitter and opening the receiver in circuit 13. Synchronizing and checking circuit 24 in receiving station B responds to receipt of a Stop character by placing circuit 23 in a transmitting condition, formulating a Correct character in cooperation with special code generator circuit 26 and transmitting the elements of the Correct character to the transmitting station A. The Correct character is received in data subset 11 at station A and is effective to cause resumption of transmission by that unit. Thereafter both stations revert to the conditions existing prior to appearance of the Stop character.

*Error in transmission*

Errors are most commonly encountered during transmission. This invention is applicable to any telephone transmission path in present use regardless of its limitations, so that errors may occur in transmission primarily from static interference to which impulse signaling is highly vulnerable. Since errors due to transmission interference appear as changes from one form of element to another in an intelligence character, a parity checking circuit will recognize a change in the number of one type of element in a character and register an error signal.

The errors described in this case occur during transmission between stations and it is assumed for this explanation that no error is present on the transmitting tape. Circuits 14 and 15, Fig. 1, will respond to Start and Stop characters as described for normal operation, stopping the tape and placing circuit 13 in a listening state after transmission of a block of intelligence characters. A parity error in one of the intelligence characters will cause circuits 24, 25 and 26 at station B to coact and produce an Error character which is transmitted back to the listening data subset 11 and also is printed on the output tape in machine 21. Control circuit 15 responds to a signal delivered by circuit 14 upon receipt of the Error character to cause the tape in machine 12 to move in reverse until the Start character preceding the block in error is again read out. The transmitter in circuit 13 remains blocked during this period so that only data subset 11 examines the tape while moving in reverse. The Start character initiates a reverse to normal operation; the transmitter is opened and the tape moves forward repeating the identical block previously transmitted in error. Should an error appear in this repeated block, the Error character fom station B is effective to cause the control circuitry in both data subsets 11 and 21 to stop transmission and reception and set off an alarm at both stations A and B.

*Tape error*

Particles of dust, foreign matter, scratches and other agents may produce an error in a character as it is printed on or read from the transmitting tape. It is necessary that such errors be recognized independently of errors in transmission to prevent fruitless repetition of a block containing a tape error. The parity checking apparatus in circuit 14 examines each intelligence character during transmission in the same fashion as circuit 24 at the receiving end. A tape error will be recognized in circuit 14 so that upon receipt of the Error character from the receiving station B, circuit 14 operates to disregard the Error character, to transmit a Tape Error character and thereafter to cause transmission to continue in the normal manner. The Tape Error character is printed on the receiving tape subsequent to the printing of the Error character thereon, thus identifying an error which has not been corrected.

*Typing error*

A number of storage mediums are employed in current data systems including punched cards, paper and magnetic tape. The directive and intelligence characters to be stored thereon advantageously may be transferred thereto by employing apparatus akin to a typewriter. The typist, upon recognition of an error in a block of intelligence, adds a Typing Error character to the portion of the block completed and proceeds to retype the block correctly. The printed tape is wound on a reel or spool in this embodiment of the invention in such a manner that during transmission the tape is read out in reverse. The receiving station, in turn, prints on the receiving tape in reverse so that it is available to be read out of the receiving unit in proper order for transcription in other forms as desired.

Upon readout in reverse by the transmitting unit, therefore, the correctly typed block of information is transmitted before the Typing Error character. Circuit 14 responds to receipt of the Typing Error character to cause control circuit 15 to block the transmitter of circuit 13. Readout continues with the block of intelligence containing the error passing only through data subset 11 and not out on the line.

An End of Signaling character may also be printed on the transmitting tape in response to receipt of which both data subsets will stop provided no error was present in the priorly transmitted intelligence block. Character marks formed in the receiving unit are printed on the output tape to define each character for ease of transcription.

Figure 11:
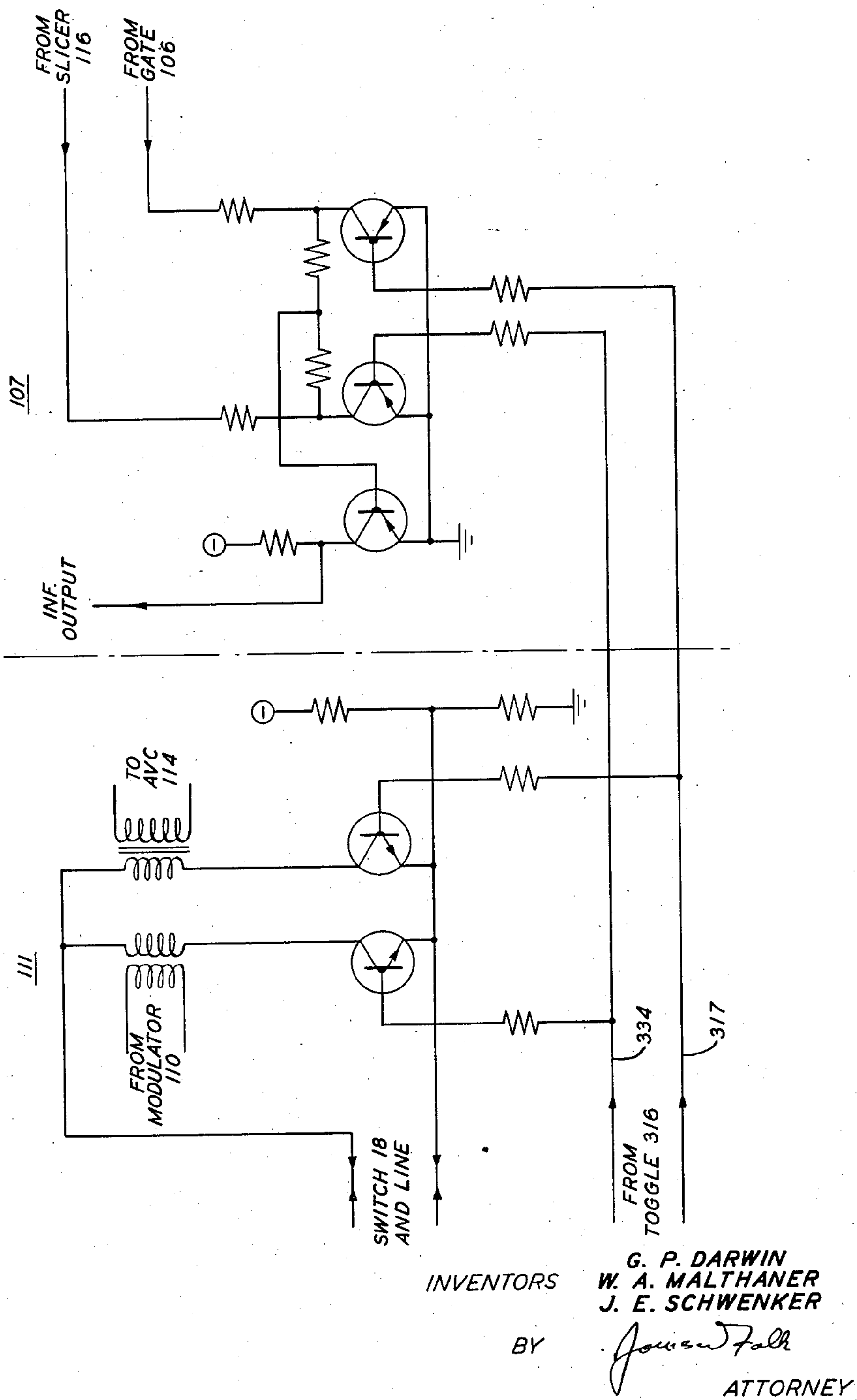
Fig. 11 is a schematic representation of specific illustrative embodiments of gate circuits 107 and 111 that may be employed in the transmitter-receiver depicted in Fig. 2.

The detailed circuits of the specific illustrative embodiment of the data subset in accordance with this invention depicted in Fig. 1 are shown in Figs. 2–5 which advantageously may be consulted together in the pattern shown in Fig. 9. Logical circuitry, that is, gating circuits of the coincidence or anticoincidence variety, are employed throughout Figs. 2–5. Such gating circuits are well known in the art and take a plurality of forms to suit the intended result. Those gating circuits indicated as And circuits in Figs. 2–5 may comprise arrangements of diodes and/or transistors such that signals on all of the input leads simultaneously will produce a signal on the single output lead. Or circuits may comprise arrangements of similar components to produce an output signal when signals are applied to any one or all of the input leads. Gates marked INH indicate that a signal applied to one of two input leads will produce a signal on the output lead unless a signal also appears on the other "inhibit" input lead. Gates or switches 107 and 111 may comprise an arrangement of transistor circuits to form a pair of coincidence gates and a switch such that enabling one gate inhibits the other gate. Specific exemplary gating circuits 107 and 111 are shown in Fig. 11, though other gate circuits known in the art could also be employed.

Figure 12:
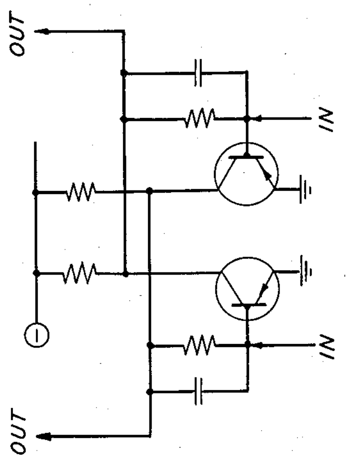
Fig. 12 is a schematic representaiton of a typical toggle circuit known in the art that may advantageously be employed in the specific illustrative embodiment of this invention described herein.

Flipflop circuits are used as toggle switches, setting themselves upon receipt of a signal on one input lead and resetting in response to a signal on a second input lead. A typical toggle circuit that we have advantageously used in this specific embodiment of this invention is shown in Fig. 12, though other toggle circuits could also be employed.

Figure 3:
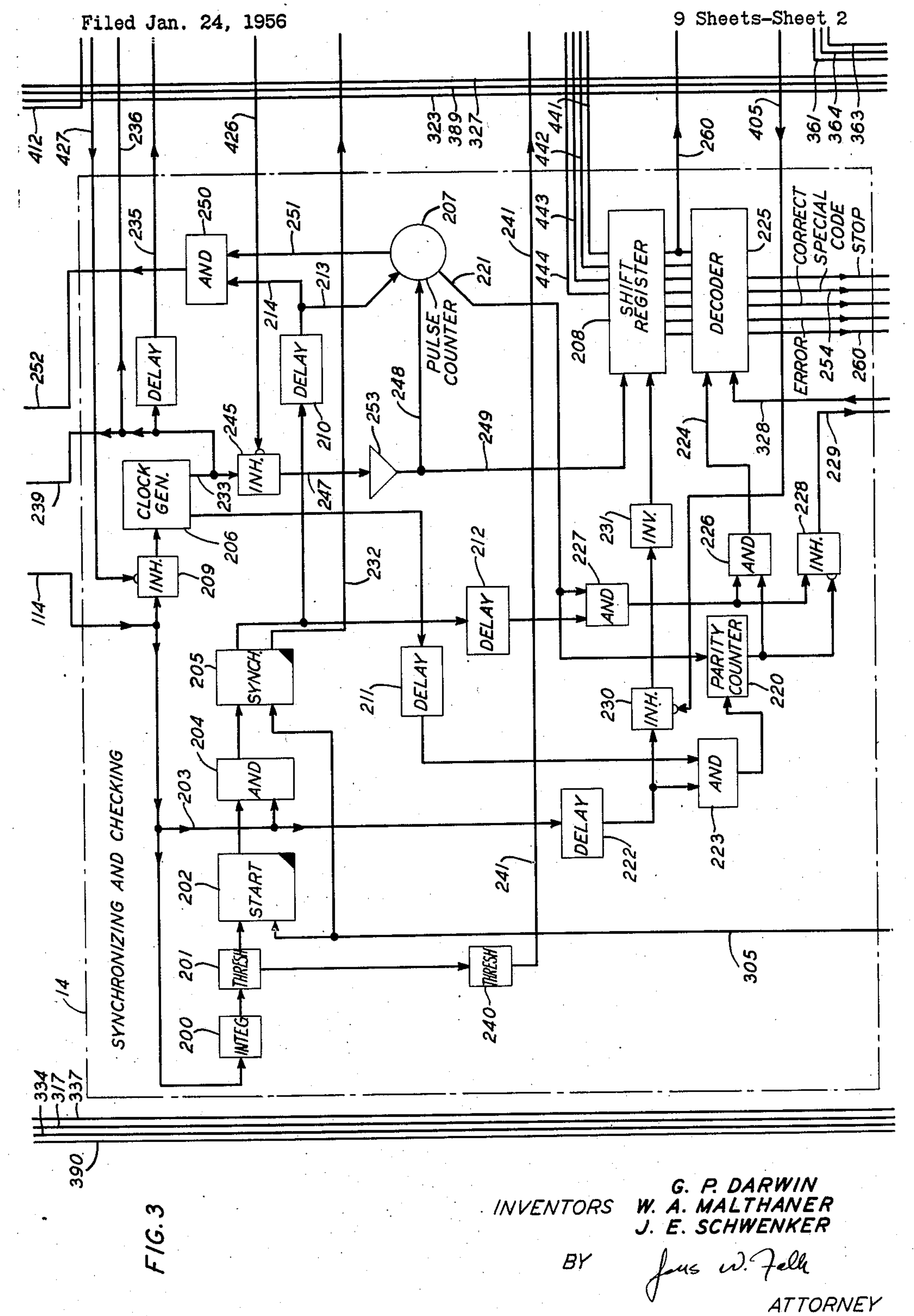
Fig. 3 is a schematic block diagram of one specific synchronizing and checking circuit portion of the data subsets shown in Fig. 1.

A clock generator 206, Fig. 3, comprising in this specific embodiment of this invention a 600 cycle multivibrator, is utilized in the synchronizing and checking circuits 14 and 24 to provide a constant source of pulses in step with the intelligence signals to operate the checking apparatus. A synchronizing circuit is included in the multivibrator circuit to keep the multivibrator in step with the intelligence by adjusting the phase of the multivibrator output each time there is a change in the type of element transmitted; i. e., a change from a "one" to a "zero" or vice versa.

Figure 10:
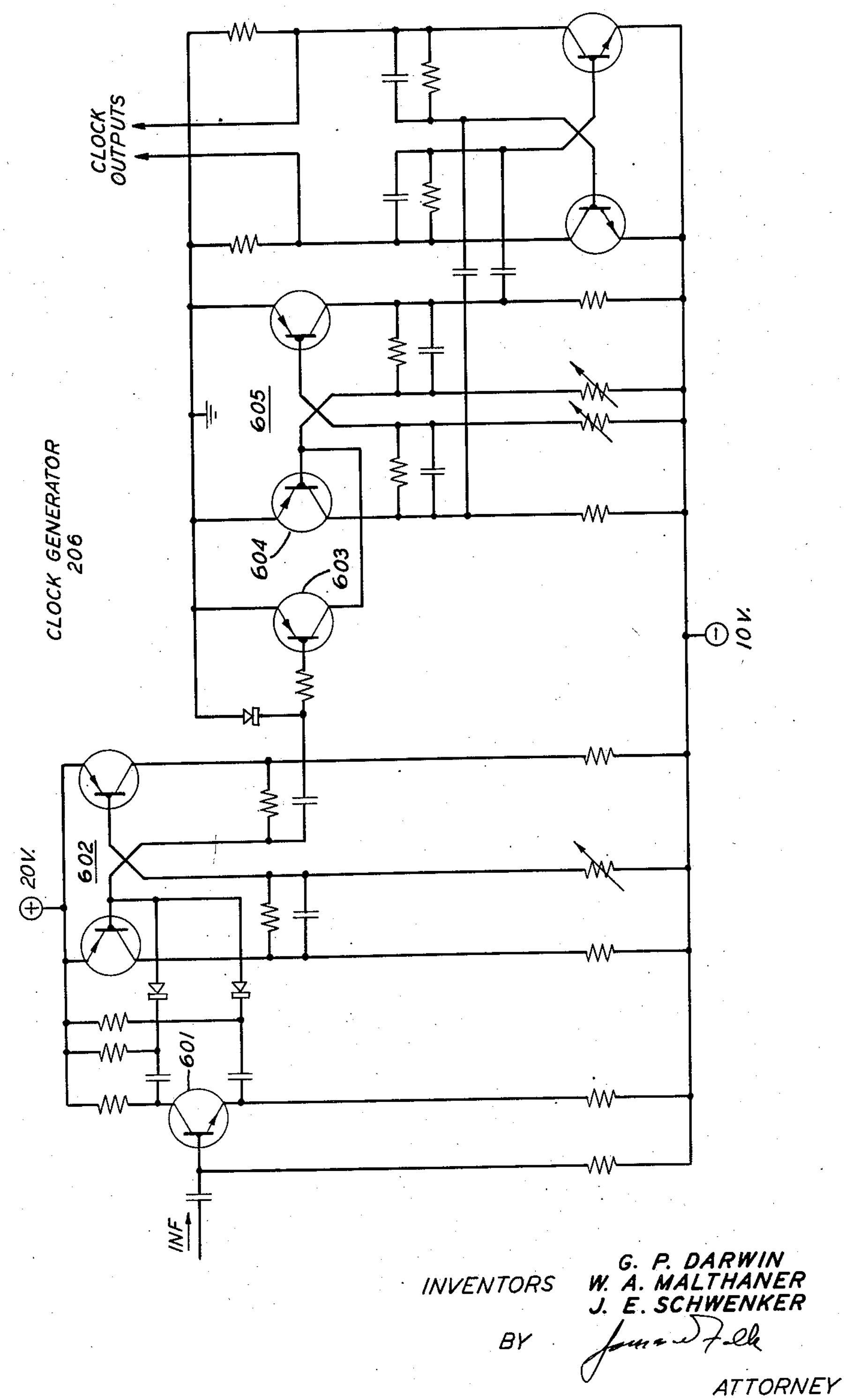
Fig. 10 is a schematic representation of one specific embodiment of a clock generator that may be employed in the synchronizing and checking circuit depicted in Fig. 3.

A detailed circuit of one illustrative clock generator 206 which performs this function and may be employed in this embodiment is shown in Fig. 10. The information signal is fed into a phase spliter including transistor 601 which in turn triggers a monostable multivibrator 602. Multivibrator 602 provides a pulse lasting for one half bit after a change in information from a "one" to a "zero" or vice versa. This pulse controls transistor 603 which grounds the base of transistor 604 (forming part of a free running multivibrator 605) for the duration of the pulse. This prevents the multivibrator 605 from free running during the pulse and allows it to start exactly in phase at the end of the pulse. The output from multivibrator 605 is used as the input to further circuitry to provide the required output timing signals.

A pulse counting circuit 207, Fig. 3, operates to count pulses emanating from the clock generator 206, Fig. 3, over lead 233, through inhibitor 245 and over lead 247, which pulses correspond to the number of elements in each intelligence character. As seven elements per character are utilized in the preferred embodiment of this invention, the pulse counter 207 will count seven pulses and then emit a character marking pulse and a word pulse, the significance of which is described hereinafter. The pulse counter 207 may advantageously comprise a ferroelectric condenser which passes accurately measured current pulses to a second condenser which in turn builds up to a critical point and fires through a rectifier circuit to produce the desired output pulses at the required point in time. Such a counting circuit is disclosed in application Serial No. 552,459 of R. M. Wolfe, filed December 12, 1955.

A shift register 208, Fig. 3, may comprise ferroelectric flipflop elements in a form as disclosed in application Serial No. 513,710 of J. R. Anderson, filed June 7, 1955. The shift register 208 receives pulses from clock generator 206 over lead 249 which pulses serve to advance serially through the register 208 pulses received from inverter 231 corresponding to the elements of each directive and intelligence character.

Figure 15:
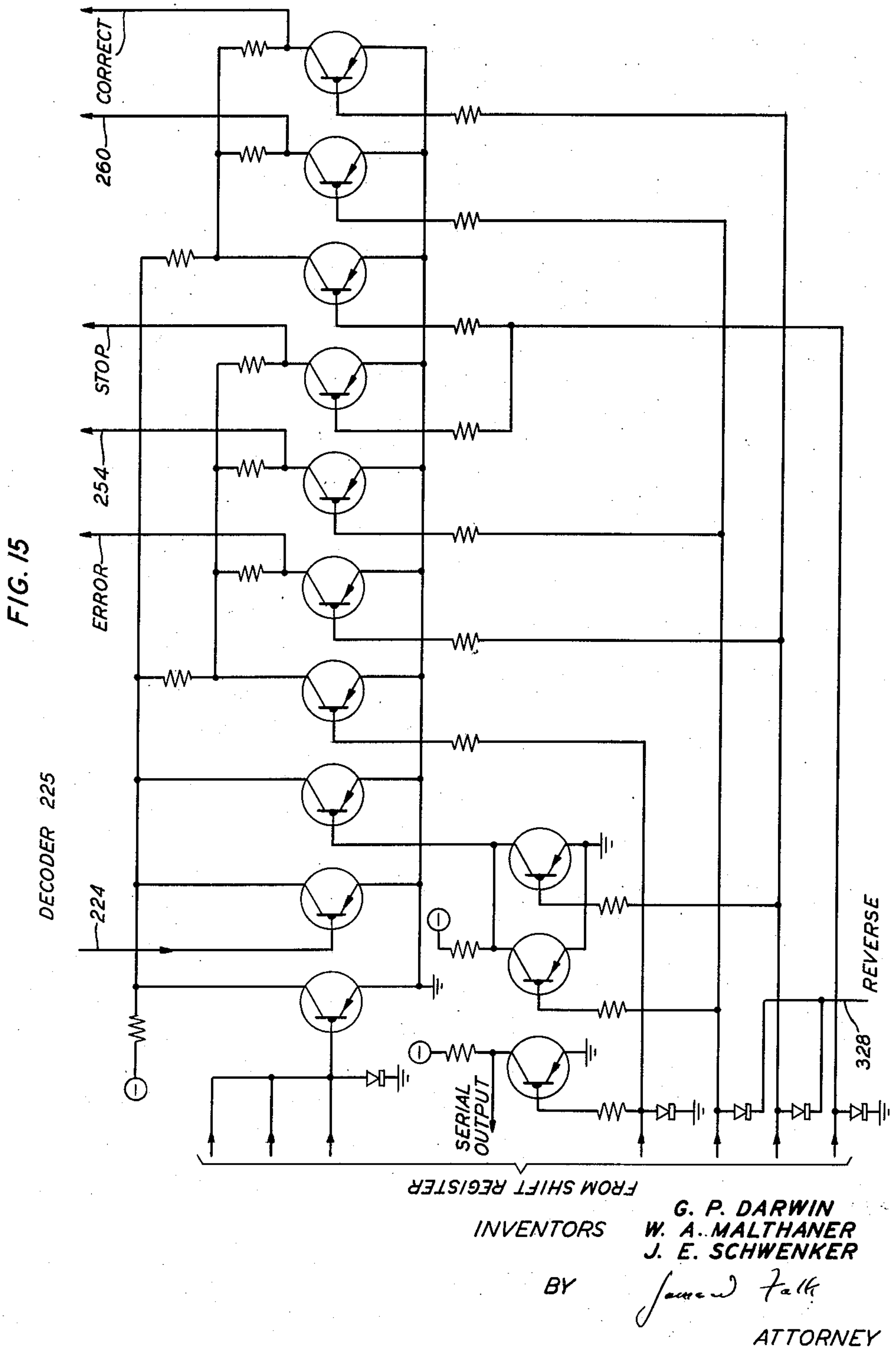
Fig. 15 is a schematic representation of one specific illustrative embodiment of a decoder circuit that may employed in the synchronizing and checking circuit depicted in Fig. 3.

A decoder 225, Fig. 3, examines each complete character in the shift register upon receipt of a signal pulse from the parity counter 220 indicating that the parity of the character is correct. Should the decoder 225 detect a directive character in the shift register 208, a pulse will appear on one of the directive leads emanating from the decoder and will direct the operation of the control circuit 15, Fig. 4. The decoder 225 may comprise a tree type selection arrangement of logic circuits, the chief components of which are transistors forming logical gates for the passage of signals from a plurality of inputs to any one of a plurality of outputs. One illustrative embodiment of a decoder 225 is shown in Fig. 15.

Figure 13:
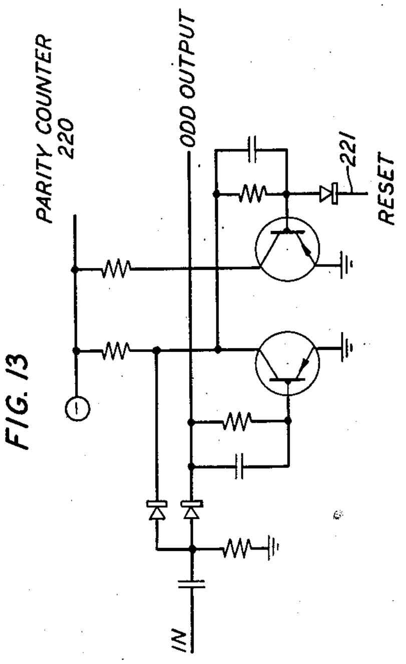
Fig. 13 is a schematic representation of one specific illustrative embodiment of a parity counter circuit that may be employed in the synchronizing and checking circuit depicted in Fig. 3.

Parity counter 220 comprises a flipflop circuit with two stable states. The flipflop circuit changes state each time a "one" signal pulse is received and is reset to one of the stable states as a reference each time a pulse is received over the Reset lead 221. If the counter receives an odd number of "ones" between reset pulses, the Odd output lead will be activated. An example of one of the many varieties of parity counters suitable for use in the data subset is shown in Fig. 13.

Figures 5, 8:
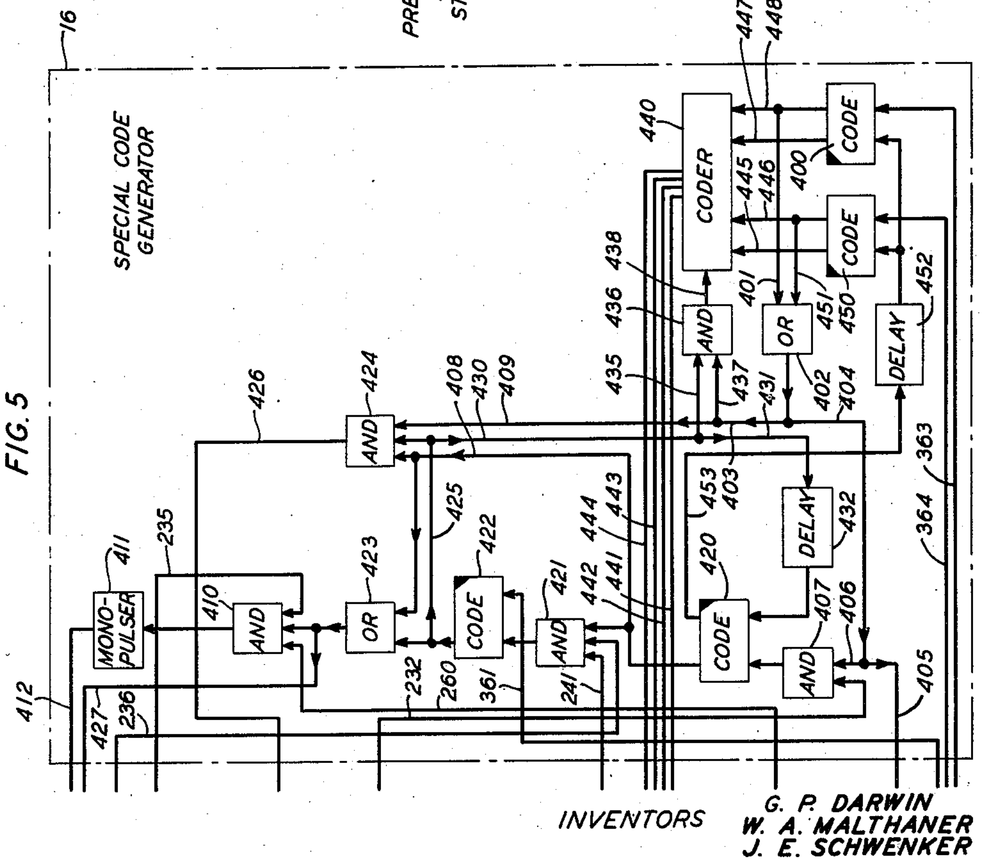
Fig. 5 is a schematic block diagram of one specific special code generator portion of the data subsets shown in Fig. 1.
Fig. 8 is a representation of the directive characters employed in the specific illustrative embodiment of this invention.
Figure 14:
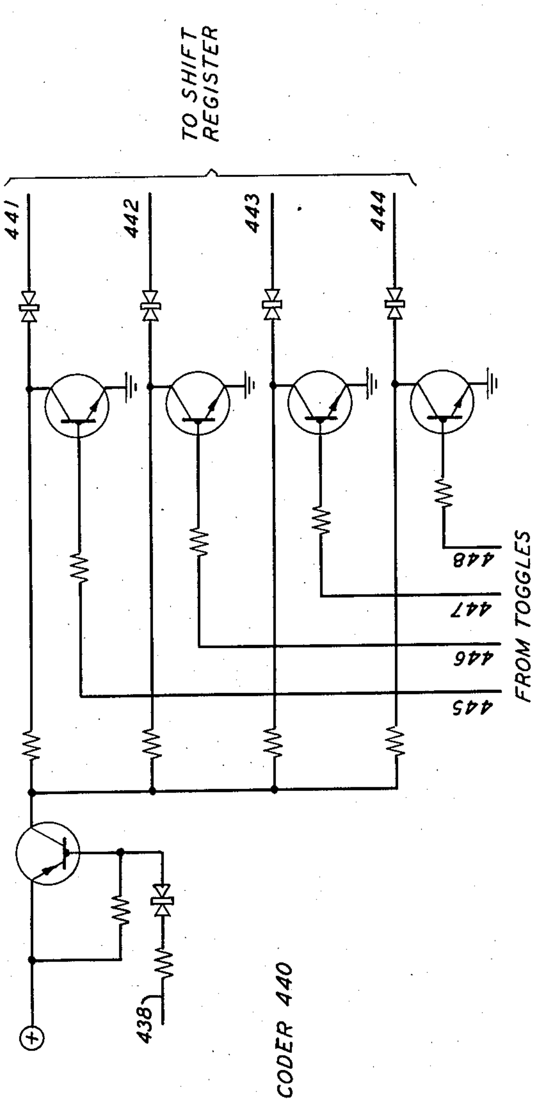
Fig. 14 is a schematic representation of one specific illustrative embodiment of a coder circuit that may be employed in the special code generator depicted in Fig. 5.

A coder 440 is an integral part of the special code generator circuit 16, Fig. 5. It may comprise logic elements including a transistor and diodes arranged to coact as a logic gate. Signals on particular combinations of input leads together with an enabling signal cause the coder 440 to pass signals over particular combinations of its output leads to the parallel inputs of the shift register 208. A detailed circuit of a typical coder is shown in Fig. 14. The coder 440 is effective to inhibit the transfer of certain of the positive pulses or binary "ones" with which the shift register 208 is filled, so that subsequent serial readout from the shift register will reveal a special code.

As the major individual portions of the synchronizing, checking and special coding apparatus have been described, the operations involving this apparatus and associated apparatus will be more fully described at this time.

*Normal operation as a transmitter*

Figure 4:
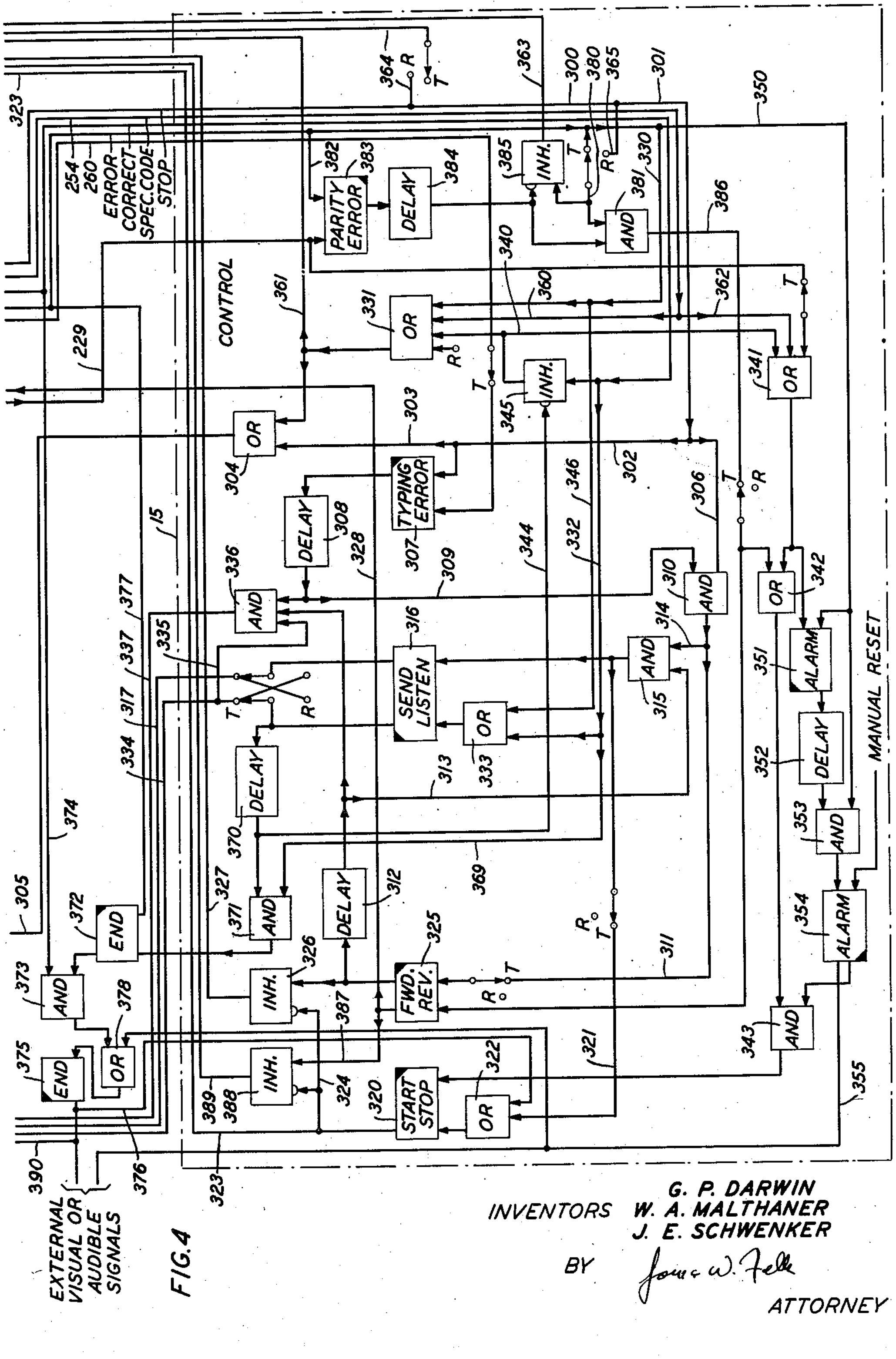
Fig. 4 is a schematic block diagram of one specific control circuit portion of the data subsets shown in Fig. 1.

In operating as a transmitter the various switches marked "T" and "R," Figs. 2 and 4, are placed in the T position. When operation begins, all toggle switches are active on the side having a shaded corner, as indicated in the drawing. Hereinafter toggles in this condition will be referred to as reset while toggles active on the side opposite the side with the shaded corner will be referred to as set. Thus Figs. 2–5 depict a data subset arranged for transmission.

After throwing the T–R switches to their T positions, the speech-data switch 18 is activated to start the tape drive 100 so that electrical impulses representing the elements of characters printed on magnetic tape 101 are transferred sequentially to information head 102, through the transmitting side of switch 104, through reading amplifier 105 to provide pulse 125, pulse shaper 126 providing pulse 127, Or circuit 106 and switch gate 107 in its preset send position. The signals thereafter are filtered in circuit 108 and used in circuit 110 to modulate a 1200 cycle carrier in a manner well known in the art, the modulated carrier passing through switch gate 111 and speech data switch 18 to the transmitting medium represented by a physical wire pair 112.

As the character impulses pass between gate 107 and filter 108 in the transmitter-receiver circuit 13, they are passed also to synchronizing and checking circuit 14 over lead 114. An integrator circuit 200, Fig. 3, receives each character pulse. The output of the integrator 200 is an increasing function of the number of consecutive "one" pulses received. If a "zero" pulse is received, the output of the integrator 200 decreases abruptly. If this decrease begins at or above a critical level; i. e., that level attained upon receipt of a prescribed number of consecutive "one" pulses, it is differentiated in threshold circuit 201 and an output pulse is provided thereby, sufficient to set start toggle 202. The output of start toggle 202 enables And gate 204 so that the next "one" pulse passing over lead 203 will cause And gate 204 to provide an output which in turn will set synchronizing toggle 205.

It will be noted that the operation just described requires a prescribed number of consecutive "one" pulses. The seven element intelligence characters do not provide sufficient "ones" for this purpose, nor do any two intelligence characters in succession. Thus only the two directive characters Start and Stop have sufficient "ones" in succession to perform the operation. All signals received prior to receipt of such directive character pulses will be ignored. The Start character, Fig. 8, comprises a long string of "ones" which carry the output value of integrator 200 to a value above the threshold value of circuit 201. The string of "ones" is succeeded by a few "zeros" and another "one." The threshold circuit 201 provides a sufficient output on receipt of the first "zero" to set start toggle 202 and the next "one" sets synchronizing toggle 205. This completes the Start code, and the synchronizing and checking circuit 14 is now prepared to examine intelligence characters.

The clock generator 206, pulse counter 207 and shift register 208, described hereinbefore, operate continuously after initial operation of the transceiver is begun. Each time there is a change between "one" and "zero" in the pulses received over lead 114 through inhibit gate 209, pulses produced in clock generator 206 are synchronized with the character pulses by a phase adjustment of the clock generator output. The output pulses of clock generator 206 serve to advance the pulse counter 207 and shift register 208; pulse counter 207 counting seven pulses, resetting and passing character mark and word pulses; and shift register 208 advancing the intelligence and directive character pulses from serial input to serial output.

The output signal of synchronizing toggle 205 passes through delay 210 and over lead 213 to reset pulse counter 207 to begin its count in synchronism with subsequent character impulses received over lead 114. A word pulse transmitted from pulse counter 207 as a result of this reset operation is received by parity counter 220 over lead 221. Parity counter 220 resets on the trailing edge of this pulse ready to receive "one" elements of the first intelligence character.

Each intelligence character is examined and checked for parity as it is transmitted. Parity counter 220 is triggered each time a "one" pulse is received over leads 114 and 203, through delay 222 and through And gate 223 in conjunction with a pulse from multivibrator 206 through delay 211. If the parity of the character elements is correct (odd), the output of the parity counter 220 enables And gate 226 and disables inhibit gate 228. If a word pulse from pulse counter 207 is passed through And gate 227 while the parity counter 220 is in this correct (odd) state, the output of And gate 226 is activated providing a pulse on lead 224 which enables decoder 225 to examine the parallel output of the shift register 208 to determine if one of the directive characters is present therein. If the parity of the character is incorrect (even), the output of parity counter 220 disables And gate 226 and enables INH gate 228. A word pulse from pulse counter 207 passed through And gate 227 with parity counter 220 in this incorrect (even) state activates INH gate 228 to provide an output pulse on lead 229. Decoder 225 will not operate under these circumstances.

Decoder 225 responds to a signal on lead 224 by inspecting the character elements present in the shift register 208 at that time, and responds to the detection of directive characters in the shift register 208 by activating one of the plurality of its output leads to control circuit 15. The decoder 225 will not respond to the detection of intelligence characters in the shift register 208.

Thus, tape 101 is being driven, the information thereon including intelligence and directive characters is being sent out on the transmission line, the parity counter is examining each character for the presence of errors and the decoder, in the absence of errors, is checking for the presence of directive characters.

For normal operation the first directive character to be transmitted after the original Start character is the Stop character, which for convenience in this embodiment is the reverse of the Start character as illustrated in Fig. 8.

The first seven elements of the Stop character consist of five "ones" and two "zeros" thus providing an odd parity combination which the parity counter will interpret as correct and pass a pulse over lead 224 to activate decoder 225. The first seven elements of the Stop code will be contained in the shift register 208 at this time, and the decoder will detect the peculiar combination thereof and register an output pulse on the Stop lead to control circuit 15, Fig. 4.

A pulse on the Stop lead passes over leads 300, 301, 302 and 303, through Or gate 304 and out over lead 305 to reset Start and Synch. toggles 202 and 205, thereby resetting the synchronizing circuits. The pulse on the Stop lead over leads 300, 301 and 306 in conjunction with the normally activated output of Typing Error toggle 307, through delay 308 and over lead 309 produces an output pulse from And gate 310. The pulse from And gate 310 passes over lead 311 to maintain Forward-Reverse toggle 325 in its reset state so as to provide an output signal through delay 312 and over lead 313 to And gate 315. The output of And gate 310 also passes over lead 314 and together with the signal through delay 312 activates And gate 315. The output of And gate 315 sets Send-Listen toggle 316 thereby activating lead 317 which in turn operates switches 111 and 107 in transmitter-receiver circuit 13. Operation of switch 111 blocks transmission of signals to the line 112, and places a receiving circuit, including amplifier and volume control 113, rectifier and filter network 115 and slicer 116, on the line. Operation of switch 107 permits signals received from the line to be passed over lead 114 to the synchronizing and checking circuit 14.

The output of And gate 315 also sets Start-Stop toggle 320 over lead 321 and through Or gate 322. The output of Start-Stop toggle 320 is operative over lead 323 to stop the tape drive 100, and over lead 324, to inhibit the output of Forward-Reverse toggle 325 at INH gate 326, thereby preventing subsequent forward motion of the tape drive 100. Thus, the operation of the transmitting unit is changed to stop the transmitting tape and to place the unit in a condition to receive signals from the line.

In normal operation the transmitted block of intelligence is error free. The receiving unit responds to receipt of an error free block of intelligence by transmitting a Start character followed by a Correct character to the transmitting unit. The development of the Start and Correct characters by the receiving unit will be described later herein. The individual elements of the Start and Correct characters from the receiving unit are passed to writing amplifier 120 in transmitter-receiver circuit 13 of the transmitting unit but are not recorded on the tape 101 since switch 104 is in the transmit position. The elements also pass over lead 114 to synchronizing and checking circuit 14, the Start character elements synchronizing the operation as previously described, and the Correct character elements being inverted and shifted serially into register 208 through delay 222, inhibit gate 230 and inverter 231.

Upon receipt of an output signal from parity counter 220 showing a correct (odd) parity check, decoder 225 examines the character elements then present in the shift register 208, and finding the arrangement of elements peculiar to the Correct code, Fig. 8, activates the Correct output lead to the control circuit 15. A signal on the Correct lead at this time passes through inhibit gate 345, Or gates 331 and 304 and over lead 305 to reset Start and Synch. toggles 202 and 205, thus resetting the synchronizing and checking circuit 14. The Correct lead signal also passes over lead 332, and through Or gate 333 to reset Send-Listen toggle 316. Lead 334 is reenergized thereby, causing switches 111 and 107 to operate and place the transmitter-receiver circuit 13 in a ready to transmit position. Lead 335 is also reenergized by the resetting of Send-Listen toggle 316 producing an output from And gate 336 over lead 337 to restore the transmitter-receiver circuit 13 to a transmitting condition by activating And gate 109.

In addition the Correct lead signal passes through inhibit gate 345, over lead 340, through Or gates 341 and 342, and And gate 343 in conjunction with the signal from Alarm toggle 354 in its normal position, to reset Start-Stop toggle 320. Energization is removed from lead 323 thereby and restored to lead 327 through inhibit gate 326. With lead 327 energized and lead 323 deenergized, the tape drive 100 again moves the tape 101 forward and transmission over line 112 is renewed.

*Error in transmission-transmitter operation*

An error in transmission results in an incorrect (even) parity check at the receiving unit and the production of an Error character thereat, which character replaces the Correct character normally returned to the transmitting unit during the listening period as described hereinbefore. The Error character is placed in the shift register 208, Fig. 3, and detected by the decoder 225 in response to which decoder 225 energizes the Error lead to the control circuit 15. A signal on the Error lead is passed over lead 380 to one input of And gate 381 and to one input of INH gate 385. The normally activated output of parity error toggle 383 in its reset position passes a signal through delay 384 to enable And gate 381 and to disable INH gate 385. Thus the signal on the Error lead activates the output of And gate 381.

The output of And gate 381 over lead 386, through Or gate 342 activates one input of And gate 343. The other input of And gate 343 is activated by the normally activated output of alarm toggle 354. The output of And gate 343 resets Start-Stop toggle 320, thereby removing the signal from lead 323 which previously stopped tape drive 100, and from lead 324 which previously prevented signals from passing through inhibit gates 388 and 326.

The output of And gate 381 over lead 386 also sets Forward-Reverse toggle 325, thereby passing a signal over lead 387, through inhibit gate 388 and over lead 389 to tape drive 100, Fig. 2. A signal on lead 389 activates tape drive 100 to move the tape 101 in reverse so as to prepare to repeat the last block of intelligence signals transmitted, the block which contained an error when received at the receiving unit.

The signal on the Error lead also resets the synchronizing and checking circuit 14 over lead 330, Or circuits 331 and 304, over lead 305 to reset Start and Synch. toggles 202 and 205, Fig. 3. The signal on the Error lead also passes over leads 330 and 346 and Or gate 333 to reset Send-Listen toggle 316, thereby energizing Send lead 334 to place switches 111 and 107 in condition to transmit. There is no signal on Transmit lead 337 at this time since Forward-Reverse toggle 325 is not in its reset state to provide one of the input signals for And gate 336 through delay 312. Thus, And gate 109, Fig. 2, failing to receive a signal over lead 337, will block the transmitter.

The final function of a signal on the Error lead is to set Alarm toggle 351 over lead 350. The initial signal sets toggle 351, but the output thereof is delayed in delay 352 so as to reach And gate 353 after the signal over lead 350 at the other input of And gate 353 has decayed. Thus there is no output from And gate 353 at this time.

Thus the control circuit 15 has responded to an Error signal to start the tape drive in reverse, place the unit in a transmitting condition with the output blocked so that transmitted data will pass only to the checking and control circuits of the unit, and place the alarm system in an alert condition.

Operating in reverse the first character read from the tape is the Stop character which appears in reverse transmission as the Start character. Fig. 8 shows the Start and Stop characters to be the reverse of one another. The synchronizing and checking circuit 14, Fig. 3, responds to receipt of the Start character in a manner previously described to synchronize the operation preparatory to examining the intelligence characters following the Start character. The tape continues to move in reverse until the original Start character, now appearing as a Stop character, is examined in the shift register 208 and detected by decoder 225. It may be noted here that the only character which the decoder 225 is permitted to detect while the tape 101 is being moved in reverse is the Stop character. This restriction is facilitated by activation of lead 328 between Forward-Reverse toggle 325, Fig. 4, and decoder 225 when toggle 325 is switched from its normal position in response to a signal on the Error lead as previously described.

Detection of the Stop character by the decoder 225 activates the Stop lead to reset the synchronizing circuits 14 by resetting toggles 202 and 205 over leads 300, 301, 302, 303, Or gate 304 and lead 305. Reverse-Forward toggle 325 is reset over a path previously traced from the Stop lead, thereby serving to remove the signal from Reverse lead 389, restoring the signal to Forward lead 327 and Transmit lead 337. The unit now is operating normally, the tape moving forward and the transmitter connected to the line. However, the unit remembers that an Error character has been received, as reflected by the switched state of Alarm toggle 351. The block of intelligence characters in which the transmission error occurred is retransmitted to the receiving unit at this time.

*Repeated transmission error-transmitter operation*

Should an error in transmission occur during the second transmittal of a block of intelligence characters, the receiving unit 21 will return an Error signal to the transmitting unit 11 upon receipt of the Stop character at the end of the block. The Error character will be detected by decoder 225 and the Error lead activated as described hereinbefore. A signal on the Error lead at this time passes over lead 350 to one input of And gate 353. The other input of And gate 353 was activated previously by the output of Alarm toggle 351 through delay 352. The output of And gate 353 sets Alarm toggle 354, thereby energizing its output lead 355 to operate an external alarm signal, not shown. A signal on lead 355 also passes through Or gate 378 to set End toggle 375, energizing lead 376, which in turn causes an output from Or gate 322 to hold Start-Stop toggle 320 in its set position. Lead 323 thus is activated to stop the tape drive 100, and INH gates 388 and 326 are prevented from providing any output. The output of End toggle 375 is also applied over lead 390 to release Speech Data switch 18 and restore the telephone subset to the line.

When the data subset has stopped operating, due to a repeated error as described above, the operator must manually reset the alarm toggle 354, as by applying a suitable pulse thereto, before further transmission of information can occur.

If the block of intelligence characters is transmitted correctly the second time, the Correct signal returned by receiving unit 21 will be detected by decoder 225 in transmitting unit 11 and the Correct lead energized. A signal on the Correct lead at this time will pass through inhibit gate 345, over lead 340 and through Or gate 341 to reset alarm toggle 351, thus preventing a subsequent Error signal from operating the alarm. The transmitting procedure then continues in the normal manner.

*Error on transmitting tape-transmitter operation*

The error operation described hereinbefore assumes that the error occurred during transmission between stations. It is possible, in addition, that errors may appear on the magnetic tape due to dust, scratches or other blemishes effective to change the characteristics of an element or elements in an intelligence or directive character. Such errors will be detected by parity counter 220 of the transmitting unit 11, the output of which allows a signal from pulse counter 207 to pass through inhibit gate 228 over lead 229 to set Parity Error toggle 383. The receiving unit 21 will recognize the tape error in the same manner as recognition of a transmission error and return the Error character to the transmitting unit 11 at the end of the block in eror. The Error lead is activated upon detection of the Error character by decoder 225 in the transmitting unit. With toggle 383 set, the inhibiting input of inhibit gate 385 is not energized, and a signal on the Error lead, over lead 380 is allowed to pass through inhibit gate 385 to Code toggle 400 of special code generator 16 over lead 363, setting toggle 400. The signal on the Error lead also resets send-listen toggle 316 over leads 330 and 346 and through Or gate 333, thus energizing the Send lead 334 and the Transmit lead 337. Signals on leads 334 and 337 serve to place transmit-receive circuit 13 in a transmitting condition but the tape drive 100 remains stopped. The synchronizing and checking circuit 14 is reset by the signal on the Error lead over lead 330, through Or gates 331 and 304 and over lead 305 to toggles 202 and 205. The transmitting unit 11 is now in condition to transmit signals from the special code generator 16 over the line.

The procedure briefly is to formulate a Start character internally which is transmitted over the line and also back into the checking circuit of the transmitting unit to synchronize the operation. Meanwhile, the shift register 208 is filled with "ones" and stopped. The coder 440 inhibits the transfer of certain of the "ones" in the shift register 208, thus formulating the special code or Tape Error character which is subsequently shifted out of the register 208 and transmitted over the line. The Tape Error character also is fed back into the shift register 208 where it is detected and used to restore the unit to normal transmission. The Tape Error character advises the receiving unit 21 to print an error signal on the output tape and proceed with normal operation since the error is on the transmitting tape and not in transmission. The detailed operation to provide the Tape Error character follows.

The signal on lead 363 from the Error lead through inhibit gate 385 sets Code toggle 400, energizing lead 401, Or gate 402 and leads 404 and 405 to inhibit gate 230, in Fig. 3. Inhibit gate 230 responds to inhibit the passage of pulses to inverter gate 231, which in turn is operative, lacking input pulses, to pass a continuous train of "one" pulses to the shift register 208. The "one" pulses are fed serially from the shift register 208 to one input of And gate 410, Fig. 5. Synchronizing toggle 205, Fig. 3, in being reset by a signal on lead 305, as previously described in the resetting of circuit 14, energizes its output lead 232, which in conjunction with the output of toggle 400 over leads 401, 404 and 406, operates And gate 407. The output of And gate 407 sets Code toggle 420 so as to energize one input of each of And gates 421 and 424, and Or gate 423. The signal from Or gate 423 energizes a second input of And gate 410, the third input being energized by pulses from clock generator 206 over lead 235. The output of And gate 410 energizes monopulser 411 to pass "one" pulses to Or gate 106 over lead 412, and from Or gate 106 the pulses are transmitted over the line 112 to the receiving unit and over lead 114 to checking circuit 14. The signal from Or gate 423 also passes over lead 427 to inhibit gate 209 which in turn prevents character pulses from reaching clock generator 206 allowing the clock generator to run free during formation of the special code character.

The train of "ones" over lead 114 is received in integrator 200 which builds up its output voltage to a point above the reference voltage in threshold circuit 201. The overflow is passed to a second integrator and threshold circuit 240 which builds up to a second threshold value and energizes its output lead 241, which lead is also an input lead of And gate 421 in special code generator circuit 16. When the phase of the signal on lead 236 between clock generator 206 and And gate 421 is correct, And gate 421 produces an output. The output of And gate 421 sets Code toggle 422 thereby energizing an input of And gate 424 over lead 425. Inputs over leads 408 and 409 in conjunction with energization of input lead 425 cause And gate 424 to energize its output lead 426, thereby activating inhibit gate 245 to prevent subsequent pulses from clock generator 206 from advancing pulse counter 207 and shift register 208. The output from the shift register 208 is cut off thereby, and in turn the output of monopulser 411 is stopped. The checking circuit 14 thus begins, in effect, to read "zeros" or absence of "ones" pulses.

The first threshold circuit 201, upon receipt of "zeros" cuts off its output abruptly, setting toggle 202 so as to energize one input of And gate 204. The output of toggle 422 in circuit 16 also passes over leads 425, 430 and 431 and through delay 432 to reset toggle 420 after a two element delay; i. e., sufficient time for the checking circuit 14 to read the two "zeros" of the Start character, which "zeros" serve to permit operation of Start toggle 202. The resetting of toggle 420 removes the signal from leads 408 and 426, thus allowing inhibit gate 245 to pass subsequent advance pulses from clock generator 206 to pulse counter 207 and shift register 208. Advancement of pulses in shift register 208 will produce another "one" pulse on lead 412 from monopulser 411 which constitutes the final "one" of the start code and serves to operate And gate 204 to set Synch. toggle 205. Circuit 14 now is synchronized as described hereinbefore and prepared for normal transmission.

At the time the two "zeros" were transmitted, toggle 422 also energized leads 425, 430 and 435 operating And gate 436 in conjunction with the energization of the other input to And gate 436 from toggle 400 over lead 401, Or gate 402 and leads 403 and 437. The output of And gate 436 activates coder 440 to energize two of its four output leads 441—444 dependent upon the nature of the input from toggles 400 and 450. In this instance input leads 445 and 448 are energized. The output of the coder 440 is effective to inhibit the transfer of two of the "ones" in the shift register 208, so that when advancement of the shift register's content begins anew the serial output from the shift register will contain two "zeros" in the proper relative positions to indicate the special code or Tape Error character.

The resetting of toggle 420 also serves to reset toggle 400 after the short delay incurred in delay 452. It is during this delay that the two "zeros" are "inserted" in the shift register 208. The resetting of toggle 400 removes the signal from leads 401 and 405, reopening inhibit gate 230 to allow character elements from the transmitter-receiver circuit 13 to be shifted into shift register 208. The signal is also removed from leads 403 and 437 responsive to which the coder 440 deenergizes its output leads to the shift register 208, preventing the inhibition of additional "ones" while the character elements are being advanced in the shift register 208.

The special code is fed from the serial output of the shift register 208 to And gate 410 which responds to each "one" signal to activate monopulser 411. Thus a reproduction of the special code is transmitted over lead 412, through Or gate 106, switch 107, through the transmitting chain to the line, and over lead 114 to the checking circuit 14. Thus, as the special code is being transmitted, it is being fed back into the shift register 208 where it is detected by the decoder 225 in the normal manner, thereby causing the special code lead 254 to be energized. The signal on lead 254 passes over lead 360 through Or gate 331, over lead 361 to reset toggle 422 and through Or gate 304 and over lead 305 to reset toggles 202 and 205. The signal on Special Code lead 254 also passes over lead 362, and through Or gate 341 to reset Alarm toggle 351, and through gates 342 and 343 to reset Start-Stop toggle 320, effective to start the tape drive 100 in the forward direction.

The Alarm toggle 351 is reset to assure that the transmitting unit does not remember the tape error and set off the alarm upon receipt of any subsequent error character from the receiving unit 21. The transmitting unit now is proceeding to transmit the next block of intelligence characters having advised the receiving unit by means of internally developed Start and special code characters that an error was recognized, but since it was an error on the transmitting tape rather than in transmission, it will be acknowledged by the recording of the special code character on the output tape and transmission then will continue in a normal manner.

Figure 6:
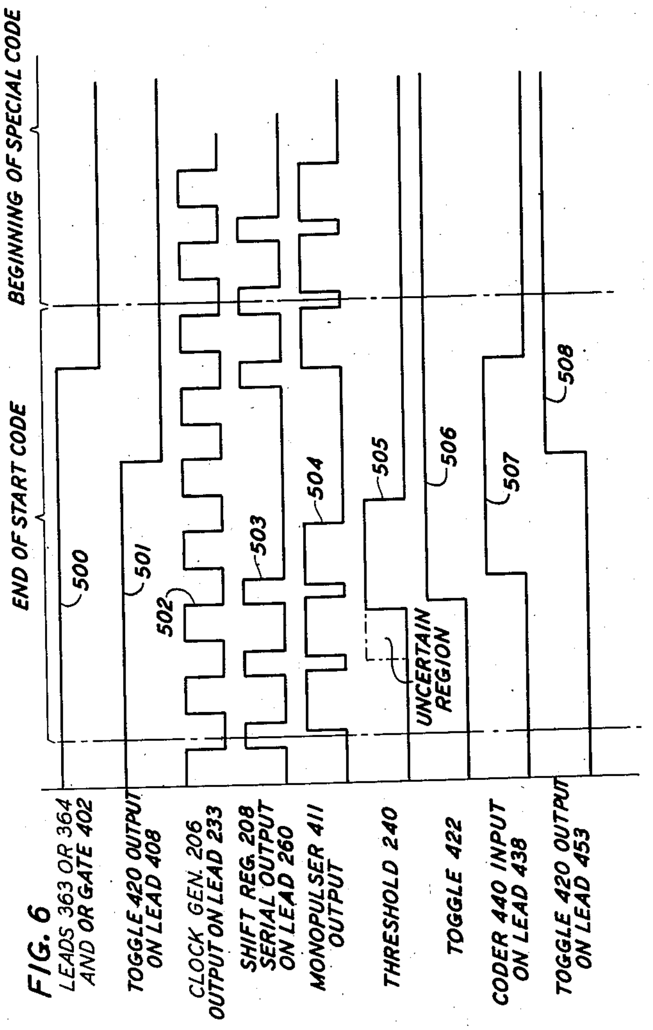
Fig. 6 is a time diagram illustrating the sequence of signals utilized in forming directive characters in the data subsets.

A further appreciation of the internal production of directive characters in this specific embodiment of this invention may be obtained from Fig. 6 which is a timing sequence plot of various control pulses and other signals necessary to attain this result. One or both of the input leads 363 or 364 to special code generator circuit 16 are energized with a signal 500 which signal serves to energize coder 440 according to the special character to be produced. Signal 500 also blocks the normal input to shift register 208 causing a string of "ones" pulses to be inserted therein. Toggle 420 is set in response to the signal 500 and provides the output signal 501 which appears at one input of each of And gates 421, 424 and 410. The clock generator 206 includes a synchronous pulse generator or clock which generates consecutive timed pulses 502 in step with the transmitted character pulses. Pulses 502 appear in a continuous stream on lead 233 and on lead 235 to one input of And gate 410. Pulses 502 on lead 235 are delayed in delay 234 for a sufficient time to reach And gate 410 to proper phase to sample the "one" pulses 503 now emanating from the shift register 208 over lead 260 and appearing at a third input of And gate 410. The conjunction of signals 501, 502 and 503 at inputs to And gate 410 enables it to activate monopulser 411 which in turn provides output pulses 504 forming the string of consecutive "ones" indicative of the Start character, Fig. 8.

Threshold circuit 240 passes signal 505 after receipt of the requisite number of "ones" pulses originating in the monopulser 411. The time at which the requisite number of "ones" pulses has been received is uncertain, as indicated by the uncertain region of signal 505. The conjunction of signals 500, 502, 505 at inputs to And gate 421 enables it to set toggle 422 so as to provide signal 506. Signal 506 serves to stop the advancement of pulses through the shift register 208 and to enable coder 440 to pass its control signals to the shift register 208 during the period 507 forming the special code therein. Signal 506 also appears, after a short delay in delay 432, at the normal position input of toggle 420, resetting it so as to cut off signal 501 and provide signal 508. Removal of signal 501 permits the advancement of pulses through the shift register 208, thus causing another "one" pulse 503 to issue therefrom which in turn enables monopulser 411 to produce the final "one" of the Start character. Signal 508 cuts off signal 506 to the coder 440. The special character is now shifted out of shift register 208 and repeated by monopulser 411 for transmission over the line as well as back into the shift register 208 for detection by decoder 225.

*Typing error-transmitting unit*

The magnetic tape 101 is prepared in blocks of coded intelligence characters, each block being preceded and succeeded by a Start and a Stop directive character respectively, as shown in Fig. 7. When an error in printing is detected by the operator in preparing the tape, a Typing Error character is printed on the tape between the last intelligence character of the block containing the error and the Stop character for that block, as shown in Fig. 7. The block containing the error then is followed by the same block printed correctly. Since the tape is run in reverse during transmission, the block correctly printed is transmitted first, followed by the Stop character of the block in error, serving to synchronize the transmitting and receiving units, as described hereinbefore (the Stop character in reverse appearing as a Start character). The Typing Error character appears next and is inserted in the shift register 208 and detected by the decoder 225 in the usual manner. The decoder responds by energizing Typing Error lead 260 to set Typing Error toggle 307 in the control circuit 15, thereby removing the signal from its output lead, which in turn is effective to remove the signal from Transmit lead 337 through delay 308 and And gate 336. And gate 109 in transmitter-receiver circuit 13, lacking a signal on Transmit lead 337, blocks further transmission to the line 112. Thus transmitting unit 11 continues to examine characters from the tape but prevents their transmission over the line 112.

At the end of the intelligence block including the error the Start character is read out and interpreted as the Stop character. It is detected by the decoder 225, which energizes its Stop lead to reset toggle 307 over leads 300, 301 and 302 and continuing over lead 303, through Or gate 304 and over lead 305 to reset the synchronizing circuits by resetting toggles 202 and 205. The output of toggle 307, after a short delay in delay 308 enables And gates 336 and 109, thereby unblocking the transmitter. Thus the block of intelligence including the typing error is not received at receiving unit 21, and no acknowledgement from the receiving unit 21 is required to begin transmission of the next block of intelligence.

*End of signaling-transmitting operation*

In order to shut down the transceiver units at the end of transmission an End of Signaling character is printed on the transmitting tape, which character is identical to the Correct character previously described and is detected as such by the decoder 225. The Correct lead is energized, enabling Or gate 333. Toggle 316 is in its reset position on receipt of a signal from Or gate 333, thus providing an output signal through delay 370 to one input of And gate 371 which, in conjunction with the signal from the Correct lead over leads 332 and 369, enables And gate 371. Toggle 372 is set by the output of And gate 371 and energizes in turn one input of And gate 373. The signal on the Correct lead has disappeared by this time, so that no signal is present on the other input of And gate 373 over lead 374 to enable it. The Stop signal (Start in reverse) is read from the tape and is detected by decoder 225 at this time and is effective to stop the tape drive and place the transmitting unit in a listening state as previously described herein.

Should the Error character be returned from the receiving unit rather than the Correct character at this time, end toggle 372 is reset over the Error lead and lead 377, and the block received in error is repeated, the End of Signaling character again setting toggle 372. A Correct signal from the receiving unit at this time will be detected by decoder 225 and the Correct lead reenergized passing a signal over lead 374 to enable And gate 373. The output of And gate 373, through Or gate 378, sets End toggle 375. The output of toggle 375 activates an external signal, and passes over lead 376 and through Or gate 322 to prevent start-stop toggle 320 from being reset by the signal on the Correct lead, thus preventing the tape drive 100 from starting anew. The output of toggle 375 also actuates the speech-data switch 18 over lead 390 so as to restore the telephone subset 17 to the line 112.

Although the Correct and End of Signaling characters are identical and serve to energize the Correct lead in the control circuit 15, the transmitting unit 11 must be in a transmitting condition to treat this character as an End of Signaling character. In the receiving or listening condition, send-listen toggle 316 is set, and the Correct character merely resets it. There is coincidence of the signals at the two inputs to And gate 371, required to set toggle 372, only when the Correct signal appears on leads 332 and 369 when toggle 316 is in its reset position.

*Normal operation-receiving unit*

In considering the receiving operation, Figs. 2–5 are utilized, visualizing all switches marked T and R as being in the R position. Thus incoming signals pass through switch 111, the receiving facilities, switch 107, lead 121, writing amplifier 120, lead 104 and writing head 102 for recording on tape 101 which is continuously driven forward after the initial start of operation. Pulses from clock generator 206 over lead 239 to amplifier 120 serve to time the pulses to be printed on the output tape 101. When operation is initiated, control circuit 15 activates leads 327 and 317 causing the tape to move forward and the transmitter-receiver circuit 13 to assume a listening status.

The receiving unit examines incoming signals over lead 114 in identical fashion to that described for the examination of outgoing signals by the transmitting unit. Thus the receiving unit synchronizes on receipt of the Start character (Stop in reverse) and begins examining each intelligence character for proper parity. An additional feature incorporated in the receiving unit operation is the printing of a character mark on a second track of the receiving tape through writing head 103 to delineate the division between characters printed on the tape. After synchronizing on the Start signal, synchronize toggle 205, Fig. 3, passes a signal through delay 210 to pulse counter 207 and to And gate 250 which, in conjunction with an output from pulse counter 207 over lead 251 after counting seven elements, passes a signal over lead 252, through amplifier 130 and writing head 103 to print the character mark on the output tape. Such marks are repeated upon each count of seven by the pulse counter 207 after synchronization, thus printing one character mark per character on the output tape. The Stop character (Start in reverse) is received at the end of the block of intelligence characters and is detected by decoder 225. The receiving unit must now return an acknowledgment signal which for normal operation (no errors detected) would be the Correct character, Fig. 8. The Stop lead is energized passing a signal over lead 364 to set toggle 450 of special code generator 16, thereby energizing leads 451 and 446. The signal on the Stop lead also is passed over leads 300, 301, 302, Or gate 304, and lead 305 to reset the synchronizing circuits, resetting toggles 202 and 205, Fig. 3. The output signal from Synch. toggle 205, after being reset, passes over lead 232 to set toggle 420 through And gate 407 in conjunction with the output of toggle 450 over lead 451, through Or gate 402 and over leads 404 and 406. This initiates the operation of the special code generator which proceeds as described hereinbefore, input leads 446 and 447 of coder 440 being energized to produce the Correct character. The signal on the Stop lead over leads 300, 301, 306, through And gates 310 and 315, acts to set toggle 316. The output of toggle 316 now passes through the T–R switch in its R position to Send lead 334, and over lead 335 to enable And gate 336 to energize the Transmit lead 337. Signals on the Send and Transmit leads 334 and 337, respectively, change the transmit-receive circuit 13 from a listening to a transmitting condition, and the Correct character developed by the special code generator 16 is transmitted over the line 112 and to read-write head 102 for printing on the tape 101.

When the Correct character is detected by decoder 225 in the receiving unit 21, control circuit 15 responds to the signal placed on the Correct lead to restore the listening condition and to reset the synchronizing circuits 14.

*Error in transmission-receiving unit*

An error in transmission is recognized in the receiving unit 21 by the parity counter 220 which responds to an error by providing a "zero" output signal to gates 226 and 228. Thus on receipt of the word pulse from the pulse counter 207 over lead 221 and through And gate 227, inhibit gate 228 will pass the pulse over lead 229 to set toggle 383. Toggle 383 no longer provides an output to inhibit gate 385, so that when the Stop signal is detected at the end of the intelligence block, the signal on the Stop lead over lead 365 will pass through inhibit gate 385 and over lead 363 to set toggle 400, energizing code input lead 448. The signal on the Stop lead over lead 364 sets toggle 450 to energize lead 446. Coder 440, with input leads 446 and 448 energized, will provide the outputs required to form the Error character which is transmitted over the line 112 and printed on the tape 101 in the same manner as described hereinbefore for the Correct character.

Detection of the Error character in the receiving unit 21 energizes the Error lead to the control circuit 15 which in turn initiates the resetting of the synchronizing circuits 14 and restores the receiving unit to a listening condition. In addition the signal on the Error lead over lead 350 sets the Alarm toggle 351. Receipt of another transmission error and the consequent production, transmission and detection of an Error character will set Alarm toggle 354 and operate the associated external alarm signal. The output of Alarm toggle 354 also serves to stop the receiving unit 21 by activating a circuit over lead 355, through Or gate 378, toggle 375, lead 376, Or gate 322, toggle 320 and over Stop lead 323 to the tape drive 100.

*Error on transmitting tape-receiver operation*

The receiving unit does not distinguish between transmission errors and errors on the transmitting tape but will return the Error signal to the transmitting unit 11 in either case. As described hereinbefore, the transmitting unit 11 will transmit the special code or Tape Error character subsequent to receipt of the Error signal from the receiving unit 21. The receiving unit 21 responds to detection of the Tape Error character by resetting its Alarm toggle 351 and resetting the synchronizing circuits. The Tape Error character also is printed on the output tape 101. The receiving unit 21 now is prepared to receive subsequent intelligence characters in the normal manner.

*Typing error-receiving unit*

The sequence of directive characters received by the receiving unit 21 when a typing error is involved is Start, Typing Error and Start. The block of intelligence characters and the Stop character following the Typing Error character on the transmitting tape are blocked in the transmitting unit 11 as described hereinbefore. Thus the receiving unit 21 is synchronized by the first Start character. The Typing Error character will be examined by the decoder 225 and a signal placed on the Typing Error lead 260, effective through Or gates 331 and 304 and over lead 305 to reset the synchronizing circuits 14. The next signal received from the transmitting unit 11 is the Start character which will cause the receiving unit 21 to synchronize and proceed with normal operation.

*End of signaling-receiving operation*

Upon detection of the End of Signaling character, which as described hereinbefore, is identical to the Correct character, decoder 225 in the receiving unit 21 energizes the Correct lead. The receiving unit 21 is in a listening condition (toggle 316 in its reset position) when this character is received so that inhibit gate 345 has its input lead 344 energized, thus preventing the signal on the Correct lead from resetting the synchronizing circuits 14 and from resetting Alarm toggle 351 if presently set. The signal on the Correct lead over leads 332 and 369 coincides with the output of toggle 316 in its reset position through delay 370 so that And gate 371 produces an output at this time to set toggle 372. The Stop character is then transmitted to receiving unit 21 which responds thereto by transmitting the Correct character to the transmitting unit 11 if no error was detected in the previous block of intelligence. The Correct character also is detected by decoder 225 of the receiving unit which again energizes the Correct lead, the signal passing over lead 374, enabling And gate 373 to set toggle 375 through Or gate 378, thereby initiating the external signal for the receiving unit 21 indicating an end of signaling condition and operating the speech-data switch 28 over lead 390 to restore the telephone subset 27 to the line 112. If an error was found in the last intelligence block transmitted, the receiving unit 21 will return the Error character to the transmitting unit 11, and respond to detection of the Error character by its decoder 225 to set Alarm toggle 351 and reset toggle 372, thus preparing for a second transmission of the intelligence block.

When the transmission of the data between the data subsets has been completed, as described above, a signal from toggle 375 over lead 390 causes the switches 18 and 28 automatically to return the telephone subsets 17 and 27 to the line 112. If desired the parties can then further converse over the telephone connection. However if the telephone subsets had priorly been returned to their cradles while the data was being transmitted, then immediately upon restoring the telephone subsets to the line, the connection between stations A and B will be disconnected. Thus the telephone connection between stations is always under control of the telephone subsets, as in normal telephone usage.

It is to be understood that the above-described arrangement is illustrative of the application of the principles of the invention. Numerous other arrangements may be devised by those skilled in the art without departing from the spirit and scope of this invention.

What is claimed is:

1. In a telephone system, a transmission line, a telephone station connected to each end of said line, a data subset associated with each of said stations arranged such that data transmitted from either end of said line occupy the same limited band width in the frequency range of the transmission line, storage means coupled to said data subsets, connecting means for placing said data subsets in a transmitting or receiving condition, means operating said connecting means to place one data subset in a transmitting condition and the other data subset in a receiving condition, means converting data in said storage means of said transmitting data subset into electrical signals and applying said electrical signals to said line, means in said receiving data subset for converting said electrical signals received over said line into data stored in said receiving data subset storage means, and control means connected to said storage means and said connecting means in each of said data subsets for monitoring said electrical signals, said transmitting data subset control means including means responsive to electrical signals transmitted from the associated data subset to form internal directive signals effective to determine the transmitting or receiving condition of said associated connecting means and further including means responsive to electrical signals received from said receiving data subset to redetermine the transmitting or receiving condition of said associated connecting means.

2. In a telephone system the combination as claimed in claim 1 in which said control means comprises means responsive to signals received over said line to record delineations in said storage means, each of said delineations being so positioned in said storage means as to identify each series of received signals constituting a received character.

3. In a telephone system the combination as claimed in claim 1 in which said control means comprises checking means, means responsive to recognition by said checking means of an error in said electrical signals received over the line to generate a directive signal, and means for transmitting said directive signal over said line and for recording said directive signal on said output storage means.

4. In a telephone system the combination as claimed in claim 1 in which said control means comprises checking means, means responsive to recognition by said checking means of an error in said electrical signals applied to the line to store an error signal, said checking means further responsive to receipt over the line of an error responsive directive signal to transmit said stored error signal over the line, and means operative thereafter to continue normal transmission over said line.

5. In a telephone system a line, data receiving means, means for connecting said data receiving means to said line, output storage means coupled to said data receiving means, means for converting electrical signals received from the line into data stored in said storage means, a fixed number of said electrical signals defining a data character, and control means responsive to receipt of said fixed number of said signals to record a character defining mark in said storage means.

6. In a telephone system, a data transmission subset including a transmitter for transmitting a continuous succession of electrical pulses representing a plurality of code characters and a receiver for receiving the electrical pulses and reproducing them at an output from said receiver, said receiver including means for generating pulses in synchronism with said received pulses, and pulse integrating means connected to said generating means, said integrating means responsive to receipt of a plurality of pulses from said generating means to emit a signal to mark said output so as to define the plurality of received electrical impulses representing a code character.

7. In a telephone system a line, data receiving means connected to said line, output storage means coupled to said data receiving means, means for converting electrical signals received from the line into data stored in said storage means, and control means comprising a source of electrical signals synchronized with said received signals and a signal integrating means connected to said source so as to store a plurality of said electrical signals and to mark said output storage means responsive to storage of said plurality of electrical signals so as to define a number of said received signals in said output storage means.

8. In a telephone system, data transmitting and receiving means, means for connecting said data transmitting and receiving means to a subscriber line, storage means coupled to said data transmitting and receiving means and including a pair of storage channels, means within said data transmitting and receiving means for converting electrical signals from the line into data stored in a first of said channels, clock pulse means within said data transmitting and receiving means for generating a train of pulses on receipt of a first of said intelligence signals, counting means within said data transmitting and receiving means for counting said pulses, and means responsive to each occurrence of a predetermined number of said pulses for recording a mark in the second of said storage channels.

9. In a telephone system a line, a telephone station and a data subset at each end of said line, means for alternatively connecting said stations and said subsets to said line, one of said subsets responsive to connection to said line in a transmitting condition to transmit a first group of intelligence signals intermediate a start and a stop signal to the other of said subsets connected in a receiving condition, control means in said subsets, said transmitting subset control means responsive to transmission of said stop signal to stop transmission, said receiving subset control means responsive to receipt of said stop signal to return one of a plurality of internally derived directive signals to said transmitting subset, said transmitting subset control means further responsive to receipt of a first one of said directive signals to retransmit said first group of intelligence signals and responsive to receipt of a second one of said directive signals to transmit a second group of intelligence signals.

10. A telephone system as claimed in claim 9 in which said transmitting subset control means is further responsive to receipt of said first one of said directive signals after said retransmission of said first group of intelligence signals to stop transmission and to actuate external alarms at each of said subsets.

11. In a telephone system, a line, a telephone station and a data subset at each end of said line, means for alternatively connecting said stations and said subsets to said line, means in one of said subsets for transmitting intelligence, start and stop signals to the other of said subsets connected to said line, checking means in said other subset responsive to a group of intelligence signals containing an error to provide an error indicating output signal, control means in said one subset responsive to transmission of said stop signal to block further transmission of intelligence signals, control means in said other subset connected to said checking means and responsive to receipt of said stop signal after receipt of said error indicating output signal to return an error signal to said one subset, and means in said one subset responsive to receipt of said error signal to cause retransmission of said group of intelligence signals.

12. A telephone system comprising a line, a telephone station and a data subset at each end of said line, means for alternatively connecting said stations and said subsets to said line, one of said subsets responsive to connection to said line in a transmitting condition to transmit intelligence, start and stop signals comprising two element types to the other of said subsets connected to said line in a receiving condition, control means in each of said subsets, and checking means connected to said control means; said checking means responsive to receipt of a first group of said intelligence signals intermediate a start and stop signal, at least one of said group of intelligence signals containing one of an odd and even number of one of said element types to provide an error indicating output signal to said control means, said transmitting subset control means responsive to transmission of said stop signal to block further transmission, said receiving subset control means responsive to receipt of said stop signal after receipt of said checking means output signal to return an error signal to said transmitting subset, and said transmitting subset further responsive to receipt of said error signal to retransmit said first group of intelligence signals.

13. A telephone system as claimed in claim 12 in which said receiving subset control means is responsive to receipt of said stop signal in the absence of said checking means output signal to return a directive signal to said transmitting subset indicating said group of intelligence signals was received correctly, said transmitting subset being further responsive to receipt of said directive signal to transmit a second group of intelligence signals.

14. A telephone system as claimed in claim 12 in which said transmitting subset control means is further responsive to receipt of said error signal after said retransmission of said first group of intelligence signals to block further transmission and to actuate alarms at each of said subsets.

15. A telephone system as claimed in claim 12 in which said transmitting subset control means is further responsive to receipt of said error signal after receipt of an error indicating output signal from said transmitting subset checking means to transmit a second group of intelligence signals.

16. A telephone system as claimed in claim 12 in which said transmitting subset control means is responsive to a transmitted signal other than said start, stop and intelligence signals to block subsequent transmission over said line, said transmitting subset control means responsive to the next transmitted start signal to permit transmission of subsequent signals over said line.

17. A telephone system comprising a line, a telephone station and a data subset at each end of said line, means for alternatively connecting said stations and said subsets to said line, one of said subsets responsive to connection to said line in a transmitting condition to transmit intelligence, start and stop signals comprising two element types to the other of said subsets connected to said line in a receiving condition, control means in each of said subsets, checking means connected to said control means, and synchronizing means associated with said checking and control means, said synchronizing means responsive to receipt of said start signal to transmit pulses in synchronism with said intelligence signals to said checking and control means, said checking means responsive to receipt of a first group of said intelligence signals intermediate a start and stop signal, at least one of said groups of intelligence signals containing one of an odd and even number of one of said element types, to provide an error indicating output signal to said control means, said transmitting subset control means responsive to transmission of said stop signal to block further transmission, said receiving subset control means responsive to said stop signal after receipt of said checking means output signal to return an error signal to said transmitting subset, and said transmitting subset further responsive to receipt of said error signal to retransmit said first group of intelligence signals.

18. A telephone system as claimed in claim 17 in which said synchronizing means comprises a clock generator providing a continuous source of pulses and means for adjusting the spacing of said pulses, said last-mentioned means responsive to receipt of a signal element of one of said element types immediately after receipt of a signal element of another of said element types.

19. A telephone system as claimed in claim 17 further comprising output storage means coupled to said data receiving means and signal integrating means connected to said output storage means and said synchronizing means, said integrating means responsive to receipt of a predetermined number of pulses from said synchronizing means to transmit a signal to said output storage means to define an intelligence signal received in said output storage means.

20. In a data transmitting system for the transmission of data over telephone lines, a data transmitter comprising transmitting means, data storage means, means for transferring data from said storage means to said transmitting means, means connected to said transmitting means for checking the accuracy of said transferred data, means for generating a distinctive signal on detection of an error in said transferred data, and means for transmitting said distinctive signal and said data over said telephone lines.

21. In a data transmitting system for the transmission of data over telephone lines, a data transmitter comprising data storage means, data being stored in said storage means in blocks preceded by a first distinctive signal and followed by the reverse of said first distinctive signal, means for transferring data from said storage means, means for checking the accuracy of said transferred data, means for stopping the transfer of said data on detection of said reversed signal, means for generating said first distinctive signal and a second distinctive signal on detection of an error in said transferred data, and means for transmitting said generated first and second distinctive signals and said data over said telephone lines.

22. A system for transmission of data over telephone lines between a transmitter and a receiver comprising storage means in said transmitter, means for transmitting said data stored in said storage means over said telephone lines to said receiver, means in said transmitter and said receiver for checking the accuracy of said data, means in said transmitter and said receiver for generating first and second error signals respectively on detection by said checking means in both said transmitter and said receiver of an error in said data, means for stopping the transmission of data, means for transmitting said second error signal to said transmitter, and means operative thereafter for transmitting said first error signal and the data next appearing in said storage means to said receiver.

23. In a system for transmitting digital data over telephone lines, a data receiver comprising a pair of magnetic heads for storing information on distinct channels of a magnetic tape, means for receiving data over said telephone lines, means for applying said data to one of said heads, means for counting the digital elements in said data, means for generating a signal on the count of a predetermined number of digital elements, and means for applying said signal to the other of said heads.

24. In a system for transmitting digital data over telephone lines between a data transmitter and a data receiver, a pair of magnetic heads in the data receiver for storing information on distinct channels of a magnetic tape, means in the data transmitter for transmitting a start signal and digital data over the telephone lines to said data receiver, a clock generator in said data receiver, means for synchronizing said clock generator with said start signal, means for counting the digits in said data, means for generating a signal on the count of a predetermined number of digits, means for applying said data to one of said heads, and means for applying said generated signal to the other of said heads.

25. In combination, a line adapted for use in transmitting signal current pulses, signal transmitting means, directive and intelligence signal storage means, switching means actuated to couple said transmitting means to said storage means and to connect said transmitting means to one end of said line, driving means actuated by said switching means to cause transfer of signals from said storage means to said transmitting means, and synchronizing, checking and control means connected to said transmitting means and said driving means and responsive to a first directive signal from said storage means through said transmitting means to stop said driving means and to place said transmitting means in condition for receiving signals incoming over said line, said synchronizing, checking and control means being operative in response to receipt of a directive signal over said line and through said transmitting means to restart said driving means and to return said transmitting means to a transmitting condition.

26. The combination in accordance with claim 25 in which said synchronizing, checking and control means is further responsive to a second directive signal from said storage means through said transmitting means to block said transmitting means and responsive to receipt thereafter of said first directive signal to unblock said transmitting means.

27. In a data transmission system, a plurality of stations interconnected by a common communication link, each of said stations comprising a signal transmitter and receiver, signaling means in each transmitter for formulating directive and intelligence signals in a code of elements of a binary form, the number of one element type in said code of elements for each of said signals being constantly one of odd and even, any other arrangement thereof indicating the presence of errors, and checking and control means in each of said stations; said checking means being operative in response to the transmission of said intelligence signals to detect the presence of errors in said intelligence signals, said control means in said receiving station responsive to the associated checking means, when the latter indicates the transmission of an erroneous intelligence signal, to effect the transmission of a directive signal to said transmitting station, and said transmitting station control means responsive to its associated checking means, when the latter detects the erroneous intelligence signal prior to its transmission to said receiving station, to disregard said directive signal, to effect the transmission of a special signal to said receiving station advising of this disregard and to continue the transmission of intelligence signals.

28. In a data transmission system, a plurality of stations interconnected by a common communication link, each of said stations comprising a transmitter, receiver and synchronizing, checking and control means, directive and intelligence signal storage means coupled to said stations, means associated with each of said stations for driving said storage means to transfer said signals to the transmitter of a station conditioned for transmission and to the storage means of a station conditioned for reception, said synchronizing, and checking and control means responsive to a first directive signal from said transmitting station to synchronize the operation of said stations; said receiving station synchronizing, checking and control means being responsive to a second directive signal from said transmitting station to report the condition of a plurality of intelligence signals received in the interim between said first and second directive signals by formulation of one of a third and fourth directive signals and transmission thereof to said transmitting station, and said transmitting station synchronizing, checking and control means being responsive to said second directive signal to block the associated transmitter and to stop the associated driving means and responsive to said third directive signal, indicating the priorly transmitted intelligence signals were free of errors, to open said blocked transmitter and to restart said associated driving means.

29. A data transmission system in accordance with claim 28 in which said transmitting station synchronizing, checking and control means is responsive to receipt of said fourth directive signal, indicating the presence of errors in the priorly transmitted intelligence signals, to set back said storage means, to open said blocked transmitter and to retransmit said priorly transmitted intelligence signals.

30. A data transmission system in accordance with claim 29 in which said transmitting station synchronizing, checking and control means is responsive to said first directive signal to examine the condition of the plurality of intelligence signals transmitted in the interim between said first and second directive signals for the presence of errors therein, and further comprises means for placing itself in a first condition if an error is found such that said fourth directive signal is rendered ineffective, said transmitting station synchronizing, checking and control means being operative in said first condition to effect the transmission of a fifth directive signal to said receiving station for recording in said storage medium thereat and to continue normal transmission thereafter.

31. A data transmission system in accordance with claim 30 further comprising means for placing said transmitting station synchronizing, checking and control means in a second condition if no error is found such that it is operative in response to said fourth directive signal to stop the associated driving means and close a circuit to an external alarm.

32. In a data transmission system, transmitting and receiving stations interconnected by a communication link, said stations each comprising a transmitter and receiver, directive and intelligence signal storage means, means for coupling said storage means to one of said transmitter and receiver at each of said stations, means for driving the respective storage means to transfer signals to the transmitting station transmitter and from said receiving station receiver, checking and control means at each station for checking each directive and intelligence signal passing through the associated transmitter and receiver and altering the operating status of the respective stations according to the nature of said signals, said checking means responsive to a first directive signal from said transmitting station storage means to synchronize the operation of said stations, said transmitting station checking and control means responsive to a second directive signal from said transmitting station storage means to block the transmitter, open the receiver and stop the driving means at said transmitting station, said receiving station checking and control means responsive to said second directive signal to formulate and pass to the associated receiver a third directive signal, the nature of which is dependent upon the correctness of intelligence signals examined by said receiving station checking and control means in the interim between receipt of said first and second directive signals, said transmitting station checking and control means responsive to receipt of said third directive signal of a nature indicating said intelligence signals were received correctly to unblock the transmitter and start the driving means at the transmitting station.

33. In an electrical communication system, the method of signaling which comprises transmitting directive and intelligence code combination signals from a transmitting station over a single channel, said intelligence signals containing two distinct element types and so coded that the number of appearances of one of said element types in a code combination signal is one of odd and even, receiving a plurality of said intelligence signals at a receiving station, distinguishing at said transmitting station and said receiving station between intelligence signals bearing said number of appearances of one of said element types and mutilated signals which do not, responding to transmission of a directive signal to said receiving station after receipt of said plurality of intelligence signals including a multilated signal to transmit an error signal from said receiving station back to said transmitting station over said single channel, and responding to the reception of such error signal at the transmitting station to cause said plurality of intelligence signals including said mutilated signal to be retransmitted unless said transmitting station also discovered the mutilated signal in which event said error signal is ignored and transmission is continued in a normal manner.

34. In a telephone system a line, a telephone station and a data subset at each end of said line, means for alternatively connecting said stations and said subsets to said line, one of said subsets responsive to connection to said line in a transmitting condition to transmit intelligence and directive signals to the other of said subsets connected to said line in a receiving condition, said directive signals including a terminating signal and a stop signal, control means in each of said subsets, said transmitting subset control means responsive to receipt of said stop signal to block further transmission, said receiving subset control means responsive to said stop signal to indicate by return of an acknowledgment signal the correct receipt of priorly transmitted intelligence signals, and said transmitting and receiving subset control means further responsive to receipt of said terminating signal, stop signal and acknowledgment signal in that order to maintain a non-transmitting condition at their respective data subsets and to actuate external indications of said condition.

35. In a telephone system the combination as claimed in claim 34 in which said transmitting and receiving subset control means are responsive to receipt of said terminating signal, stop signal and acknowledgment signal in that order to actuate said connecting means at the respective ends of said line to connect said telephone stations to said line.

36. In a telephone system, a telephone subset, data transmitting and receiving means, switching means for alternatively connecting said subset and said data transmitting and receiving means to a subscriber line, checking means within said data transmitting and receiving means for checking intelligence data transmitted over the line, and control means within said data transmitting and receiving means responsive to a pair of distinctive signals from said checking means indicative of twice transmitting erroneous intelligence over the line for automatically operating said switching means.

37. In a telephone system, the combination as claimed in claim 36 wherein said switching means normally connects said subset to the subscriber line and said control means automatically operates said switching means to restore said telephone subset to said line.

38. A signaling system comprising a transmission line, a data subset associated with each end thereof and adapted for transmitting and receiving data thereover in the telephone frequency range, storage means coupled to each of said data subsets, means for recording data in said storage means, means for transmitting prerecorded data from said storage means, and control means associated with each of said data subsets for monitoring data transmitted and received in said telephone frequency range, said control means including means responsive to directive data transmitted from the associated data subset placed in a transmitting condition to form internal signals effective to determine the transmitting or receiving condition of said associated data subset and further including means responsive to directive data received from the remote data subset to form internal signals effective to redetermine the transmitting or receiving condition of said associated data subset.

References Cited in the file of this patent

UNITED STATES PATENTS

| | | |
|---|---|---|
| 1,754,240 | Nyquist | Apr. 15, 1930 |
| 2,501,063 | Levin | Mar. 21, 1950 |
| 2,667,533 | Zenner | Jan. 26, 1954 |
| 2,677,011 | Burwell | Apr. 27, 1954 |
| 2,702,380 | Brustman | Feb. 15, 1955 |
| 2,703,361 | Van Duuren | Mar. 1, 1955 |
| 2,770,797 | Hamilton | Nov. 13, 1956 |